US011132910B2

(12) United States Patent
Hoffmann et al.

(10) Patent No.: US 11,132,910 B2
(45) Date of Patent: Sep. 28, 2021

(54) METHOD, APPARATUS AND COMPUTER-READABLE STORAGE MEDIUM FOR VISUAL TEACHING

(71) Applicant: CARL ZEISS MICROSCOPY GMBH, Jena (DE)

(72) Inventors: Anton Andreas Hoffmann, Munich (DE); Anja Christina Kaiser, Markt Schwaben (DE); Weiming Ding, Shanghai (CN); Hailei Gu, Shanghai (CN); Jiande Huang, Shanghai (CN); Kai Mo, Shanghai (DE); Shanshan Xu, Shanghai (CN)

(73) Assignee: CARL ZEISS MICROSCOPY GMBH, Jena, DE (US)

( * ) Notice: Subject to any disclaimer, the term of this patent is extended or adjusted under 35 U.S.C. 154(b) by 216 days.

(21) Appl. No.: 16/549,026

(22) Filed: Aug. 23, 2019

(65) Prior Publication Data
US 2020/0066172 A1 Feb. 27, 2020

(51) Int. Cl.
*G06G 3/04* (2006.01)
*G09B 5/00* (2006.01)
(Continued)

(52) U.S. Cl.
CPC ............. *G09B 5/00* (2013.01); *G06F 3/0482* (2013.01); *G06F 3/04845* (2013.01);
(Continued)

(58) Field of Classification Search
CPC ............... G06F 3/0482; G06F 3/04845; G06F 3/04847; G06F 3/1423; G09B 5/00
See application file for complete search history.

(56) References Cited

U.S. PATENT DOCUMENTS

| 9,405,449 B2 * | 8/2016 | Winternitz ........ G06F 3/04845 |
| 2009/0148827 A1 * | 6/2009 | Argott ...................... G09B 7/02 434/433 |

(Continued)

FOREIGN PATENT DOCUMENTS

| CN | 203759911 U | 8/2014 |
| CN | 107622708 A | 1/2018 |

*Primary Examiner* — David E Choi
(74) *Attorney, Agent, or Firm* — Shook, Hardy & Bacon L.L.P.

(57) ABSTRACT

This disclosure provides a method, apparatus and computer-readable storage medium for visual teaching. The visual teaching method includes establishing a classroom, arranging the classroom based on the real geometric layout of at least one teaching device in the classroom, and conducting the course in the classroom based on the arranged classroom, wherein the classroom comprises at least one user smart terminal, at least one teaching device and at least one of a management smart terminal and a server, at least one teaching device and/or at least one user smart terminal being communicatively connected to at least one of the management smart terminal and the server operating the classroom, each of the user smart terminals operating at least one corresponding teaching device and obtaining the status of the corresponding teaching devices. The visual teaching solution provides a course-oriented and student-oriented visual teaching environment by combining the courses, teaching devices and students.

22 Claims, 25 Drawing Sheets

(51) Int. Cl.
*G06F 3/0484* (2013.01)
*G06F 3/14* (2006.01)
*G09B 19/00* (2006.01)
*G06F 3/0482* (2013.01)
*H04L 29/08* (2006.01)
*H04L 29/06* (2006.01)

(52) U.S. Cl.
CPC ........ *G06F 3/04847* (2013.01); *G06F 3/1423* (2013.01); *G09B 19/00* (2013.01); *H04L 67/1097* (2013.01); *H04L 67/42* (2013.01)

(56) References Cited

U.S. PATENT DOCUMENTS

| | | | |
|---|---|---|---|
| 2014/0335497 A1* | 11/2014 | Gal | G09B 5/08 434/323 |
| 2015/0287329 A1 | 10/2015 | Bevenour, Jr. | |
| 2016/0085845 A1* | 3/2016 | Yoshizawa | G06F 16/381 709/204 |
| 2018/0136452 A1 | 5/2018 | Zou et al. | |
| 2020/0066172 A1* | 2/2020 | Hoffmann | G09B 19/00 |

* cited by examiner

METHOD, APPARATUS AND COMPUTER-READABLE STORAGE MEDIUM FOR VISUAL TEACHING

CROSS REFERENCE TO RELATED APPLICATION

The present application claims priorities to Chinese Patent Applications No. CN201810972634.1, filed on Aug. 24, 2018, and CN201910275843.5, filed on Apr. 8, 2019, and the entire contents thereof are incorporated herein by reference.

TECHNICAL FIELD OF THE INVENTION

This disclosure relates to digital teaching, in particular to a method, apparatus and computer-readable storage medium for visual teaching.

BACKGROUND

With the development of technology, digital classroom solutions are increasingly popular. Digital teaching is, for example, applied in classrooms with microscopes.

The conventional microscopy digital teaching schemes provide visual experience generally by using similar technologies of Zeiss Labscope (V2.7). In these schemes, the software is imaging software that can connect more than one microscope only. Teachers and students have the same access permissions in the software system, where any of them can access to any microscope in the classroom. On the display of the software shown in FIG. 1, the thumbnail is shown only as a fixed number of the microscope. This configuration makes it difficult for teachers to find microscopes in the classroom, and to manage their courses and students easier because the teachers and students have the same access permissions.

Another scheme for microscope-based digital teaching is the multimedia classroom software provided by third party for supplementing the functions that the microscopy software lacks. In these third-party solutions, the students use clients controlled by the teachers. However, these schemes cannot correspond the microscopes to the students to illustrate the context that the students use the microscope in the course teaching, nor can show the important information needed for microscopy teaching.

This section provides background information related to the present disclosure which is not necessarily prior art.

SUMMARY OF THE INVENTION

The embodiment of the disclosure is intended to provide a visual teaching solution based on digital technology. The solution provides a visual teaching environment for courses and students through teaching devices (such as microscopes) and smart terminals in classrooms, based on the use of teaching devices (such as microscopes) by students during courses conducted in classrooms. It solves the problem that the teachers cannot obtain the real layout of the classroom and the correspondence relationship between the students and teaching devices in conventional schemes, overcomes the shortcoming that the teachers cannot adjust the layout of the visual classroom and data sharing for a specific course and the privacy problem of the conventional multimedia teaching schemes.

According to one aspect of this disclosure, a method for visual teaching is proposed, including:

Establishing a classroom, the classroom comprising at least one user smart terminal, at least one teaching device and a management smart terminal and/or server, the at least one teaching device and/or at least one user smart terminal are communicatively connected to the management smart terminal and/or server operating the classroom, each of the user smart terminals operating at least one of the corresponding teaching devices and obtaining the status of the corresponding teaching devices, arranging the classroom based on the real geometric layout of the at least one teaching device in the classroom, and conducting the course in the classroom based on the arranged classroom.

According to another aspect of this disclosure, an apparatus for visual teaching is proposed, including: at least one teaching device; at least one user smart terminal, each of the user smart terminals being configured to operate at least one of the corresponding teaching devices and obtain the status of the corresponding teaching devices; an management smart terminal and/or a server configured to establish the classroom and conduct the course based on the classroom and to operate the classroom, the classroom comprising the user smart terminals and the teaching devices, the at least one teaching devices and/or the at least one user smart terminals are communicatively connected to the management smart terminal and/or the server respectively; wherein the classroom is arranged on the management smart terminal and/or the server based on the real geometric layout of the at least one teaching device in the classroom, and the course is conducted in the classroom based on the arranged classroom.

According to the third aspect of this disclosure, a computer-readable storage medium is also proposed, on which a computer program is stored, the computer program including executable instructions, which when executed by the processor, causing the processor to implement the method according to the first aspect of this disclosure.

It should be understood that the above general description and the detailed description in the following text are only exemplary and explanatory, but are not to limit the scope of this disclosure.

This section provides a summary of various implementations or examples of the technology described in the disclosure, and is not a comprehensive disclosure of the full scope or all features of the disclosed technology.

BRIEF DESCRIPTION OF THE DRAWINGS

The above and other features and advantages of this disclosure will be more apparent from the detail description of their exemplary embodiments by reference to the accompanying figures.

DETAILED DESCRIPTION OF THE INVENTION

Figure 1:
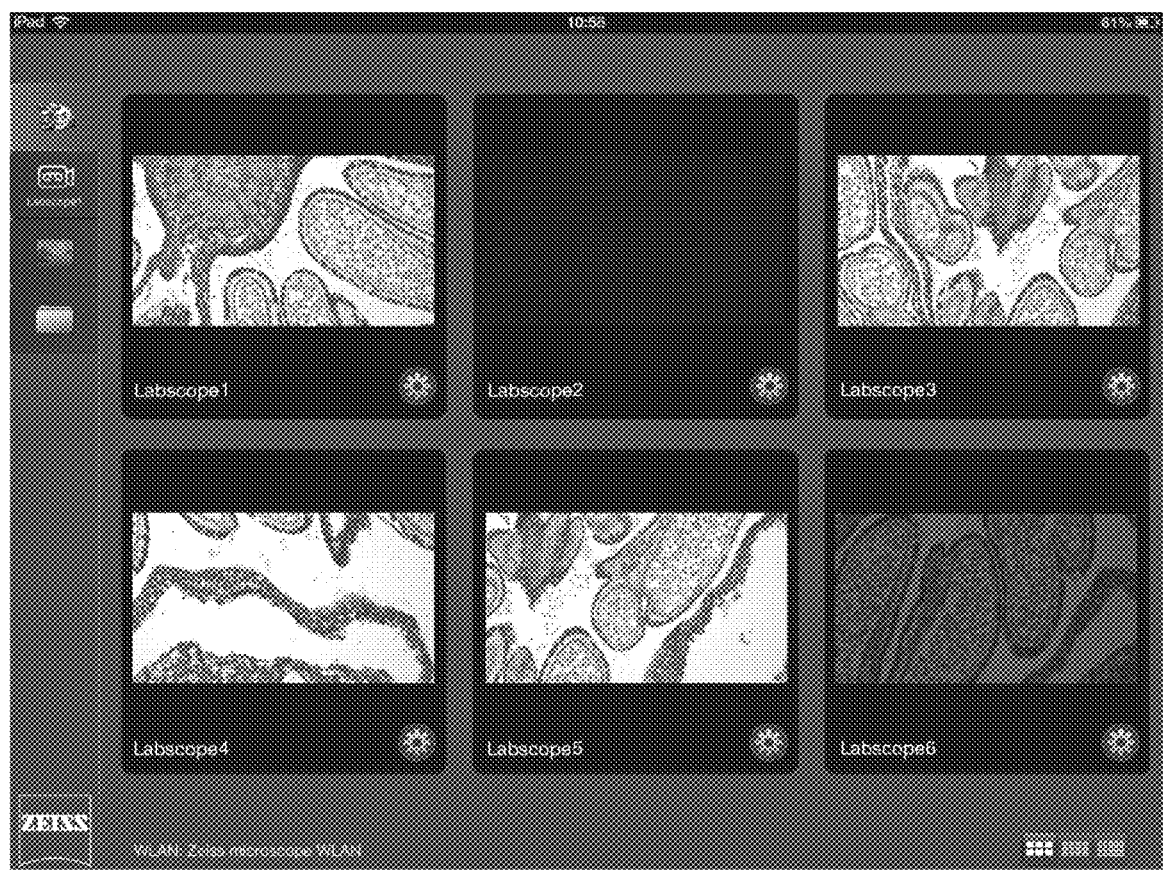
FIG. 1 shows a display interface of the software of the conventional microscope-based digital teaching scheme.

The exemplary embodiments of this disclosure are described in more details with reference to the drawings now. However, the exemplary embodiments can be carried out in many forms and should not be understood as to be limited to those described herein. The same reference numbers in the drawings represent the same or similar structures.

In this disclosure, the solution of for visual teaching by using teaching device, for example, microscopes, is introduced. However, this disclosure is not limited to the specific teaching device of microscope. The solution of this disclosure can be applied to any digital classroom where the teaching devices needed to be operated by students are used for course teaching. These teaching devices are not limited to experimental instruments, computers, operating stations, fixed or mobile machinery, etc.

For the microscope arrangement of a visual digital classroom scheme oriented by teaching device in the learning environment, the control device and the microscope can be connected by data link. The image of the microscope can be obtained by a control device in the software interface of the display unit of the visual system, thus the symbols of the microscope in the interface can be presented with the actual physical arrangement of the microscope in the classroom. The symbol of the microscope is always presented in the interface, no matter whether the microscope is used by students in the course or not. However, the visual teaching scheme oriented by teaching devices cannot be oriented by teachers and students to set for different courses correspondingly, nor can obtain more information about the course. Another shortcoming of the scheme is that the permission settings, course content, and access to experimental data cannot be managed according to access permission.

The smart terminals used by teachers and students in the visual teaching solution in this disclosure are distinguished as the management smart terminal and the user smart terminal respectively. The management smart terminals and user smart terminals can be provided uniformly by providers when providing the visual teaching system, or they can be purchased and configured separately and connected to the visual teaching system. Students participating the course can also use their own smart terminal devices to access the visual teaching system by installing an appropriate software or APP.

A visual teaching scheme oriented by course and student according to an embodiment of present disclosure will be described in detail below.

At first, the concepts introduced in the embodiments of the invention are explained.

The disclosure introduces the concept of "classroom". In reality, a classroom mainly consists of teaching hardware which includes, but is not limited to, teaching devices, such as microscopes, for course teaching. Microscopes are generally fixed in the classroom with a specific geometric layout. "Classrooms" mainly corresponds to their counterparts existing physically in reality. Classrooms are used to map the real classroom (that is, real geometric layouts in classrooms) to the teaching platform of visual teaching software, and to establish a link between geometry layout of microscopes in real classrooms and the displayed layout of the microscopes in the user interface of the visual teaching software. Classrooms are usually presented on display units or in the user interfaces (UI) with integrated functions of displaying and data inputting, which can be user interfaces for management smart terminals or server which operate classrooms.

This disclosure also introduces the concept of "course". Similarly to the teaching in real classrooms, teachers have independent permissions and contents for their own courses in the classroom. Teachers can define the access permission to the course of each student, generate groups that meet their course requirements, prepare the content before the course and put the content in the storage space for the course. Teachers can also set the software function availability of the user smart terminals that students use based on the content of the course.

Figure 2:
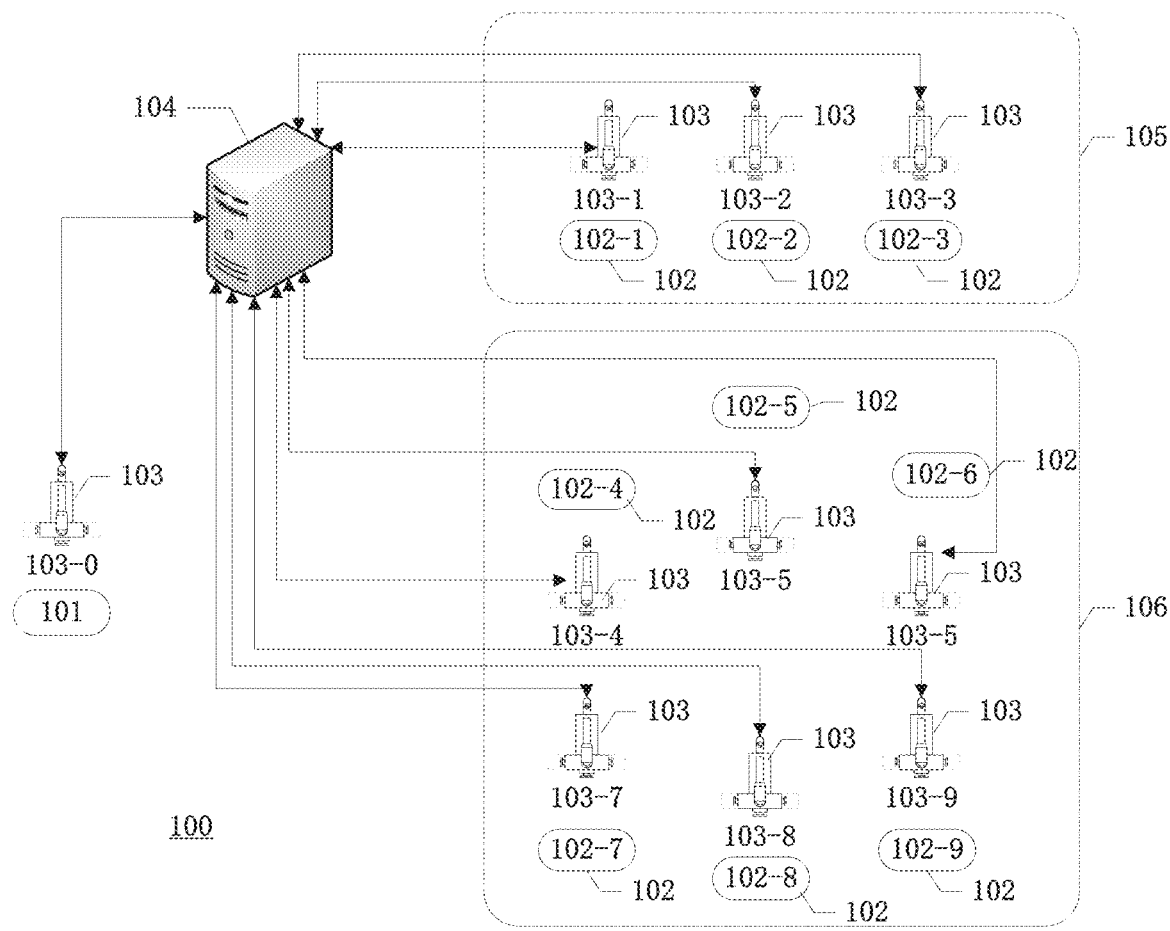
FIG. 2 shows the layout structure of a visual teaching system according to one embodiment of this disclosure.

FIG. 2 shows a visual teaching system according to an exemplary embodiment of this disclosure.

The visual teaching system 100 can include management smart terminal 101, at least one user smart terminal 102 and at least one teaching device 103 such as microscope. It should be understood that the visual teaching system 100 actually presents the layout structure of classroom and course with the symbols on the display unit or in the user interface. FIG. 2 can be considered as the physical layout of the visual teaching system 100. The system 100 can also include server 104, which is not shown in the visual layout of the classroom presented on the display unit or in the user interface generally. The user smart terminal 102 and teaching device 103 can be communicatively connected to the management terminal 101 and/or server 104, respectively.

According to one embodiment of the disclosure, the management smart terminal 101 can include a user interface (UI, for example, a graphical user interface (GUI)), a processor, a communication device and a storage device. The user interface is used to display and input data. The processor of the management smart terminal 101 is used for calculating and controlling, and carrying out the control operation that manages the user smart terminal 102. Most management and control operations to the classroom by teachers and\or administrators (such as administrators of teaching institutions or visual teaching systems) can be carried out through the management smart terminal 101. According to one embodiment of the present disclosure, more than one teachers are also supported in the course, and all of the teachers have all other permissions except for ending the course. Only teachers who start the course have the permission to end it. At this time, the visual teaching system 100 can include corresponding number of smart management terminals 101 with respect to the number of teachers.

The communication device of the smart management terminal 101 is used for data communication with the server 104, including but not limited to obtaining data coming from user smart terminals 102 and the microscopes 103 via server 104, sending control and setting commands and corresponding parameters to the server 104, the user smart terminals 102 and microscopes 103, or transmitting data between the user smart terminals 102, the microscopes 103 and the management smart terminals 101 through Internet or local area network (LAN) by sending control commands to the server 104 (at this time, the server 104 does not forwarding data from the microscopes 103). The storage device of management smart terminals 101 or the server 104 can be used to store the data required for operating the management smart terminal 101, and can also be used as the private storage subspace of the management smart terminal 101. The storage device of the management smart terminal 101 or the server 104 can also store the courseware of teachers, experimental data from the teachers in the course, and the archived data obtained by teachers after processing the experimental data from the students, etc.

In the visual layout of the classroom, the symbol in the user interface of the management smart terminal 101 can present the status of students using the user smart terminals 102. The status includes but is not limited to the personal information of students, whether the students are operating corresponding microscopes 103, and the online and operation status of the user smart terminal 102, etc. In general, teachers are also equipped with a corresponding microscope 103 to facilitate teaching. The system 100 may not assign microscope 103 for teacher, in which case the teacher in the course can guide students to operate the microscopes 103 without operating by himself or herself.

The system 100 includes one or more user smart terminals 102-1, 102-2, . . . , 102-9, which correspond to the students participating the course, respectively. In the following context, corresponding students can be marked with the labels of user smart terminals 102 (for example, 102-1).

Similar to the management smart terminal 101, the user smart terminal 102 can also include a user interface (UI, for example, a graphical user interface (GUI)), a processor, a communication device and a storage device. The calculation and control work of the processor of the user smart terminal 102 includes, but is not limited to: operating by students to the microscope 103 correspondingly interconnected to the user smart terminal 102 and obtaining of the status of the correspondingly interconnected microscope 103; operating other microscopes 103 and obtaining their status, if the access is permitted; receiving commands and data from the management smart terminal 101; accessing the storage space and the private storage subspace corresponding to the user smart terminal 102; accessing the private storage subspaces of the management smart terminal 101 and of other user smart terminals 102; displaying teaching information in the user interface of the user smart terminal 102, etc. In general, one user smart terminal 102 establishes a corresponding interconnection relationship with one microscope 103; and, a student operates the microscope 103 correspondingly interconnected with the user smart terminal 102 and obtains the status of the correspondingly interconnected microscope 103.

On the one hand, the communication device of the user smart terminal 102 performs data communication with the microscope 103, including but not limited to obtaining data from and sending control commands to the microscope 103. On the other hand, the communication device performs data communication with the server 104, including but not limited to obtaining data and commands that are sent from the management smart terminal 101 via the server 104, or sending requests to the management smart terminal 101 via the server 104. If the access is permitted, the user smart terminal 102 may also send control and setting commands and corresponding parameters to the microscope 103 of other user smart terminals 102 by the communication device via the server 104, and access other user smart terminals 102. The storage device of the user smart terminal 102 is used to store the data required for the operation of the user smart terminal 102, and can also be used as the private storage subspace of the user smart terminal 102. the experimental data produced by students in the course can be stored in the storage device of the user smart terminal 102.

According to one embodiment of this disclosure, the server 104 does not forward the image data from the microscope 103. The user smart terminal 102 establishes a direct connection to the microscope 103 to obtain image data, so as to ensure the quality and speed of the data. But other permissions and command data can be forwarded via the server 104.

In the visual layout of the classroom, the symbol of the user smart terminal 102 can present the status of the student who uses the user smart terminal 102. The status includes but is not limited to in-class state of students, and online and operation status of the user smart terminal 102, etc.

The management smart terminal 101 and user smart terminal 102 can be fixed or mobile smart terminals, according to one embodiment of this disclosure. When the smart terminals are mobile smart terminals, they can be selected from smart phones, personal digital assistants (PDAs), tablets (such as iPad of Apple Inc.), laptops or notebook computers, etc. Usually, the smart terminals are provided by the provider of visual teaching system 100, but the system allows teachers and students to take their own terminal devices and access system 100 to achieve the functions of management smart terminals and user smart terminals in the embodiment of the disclosure. Private devices are under control, and privacy is under protection, too.

The system 100 can provide the identical smart terminals for teachers, administrators and students, and supports logging in with different accounts on the smart terminals to identify the user of the smart terminal as a teacher, an administrator or a student. According to the type of account, the smart terminal used by teachers (or administrators) is recognized as the management smart terminal 101, and the smart terminal used by students is recognized as the user smart terminal 102. If teachers and students use their own device to access the system 100, they can also be identified by the account logged in.

According to the embodiment of the disclosure, the system 100 includes at least one microscope 103. In general, each microscope 103-1, 103-2, . . . , 103-9 of the microscope 103 corresponds to each of the user smart terminals 102-1, 102-2, . . . , 102-9 used by students, respectively, to indicate that a particular student operates a corresponding specific microscope 103.

The microscope 103 also includes a communication device for data interaction with the server 104. The communication device of the microscope 103 can send its own status and data to the server 104 or to the management smart terminal 101 and the user smart terminal 102 via the server 104, or can receive operation instructions and corresponding parameters from the server 104 or smart terminals to perform the microscope action required by the course. The status of the microscope 103 includes, but is not limited to, its own operation status, failure status and online status, and the data of the microscope 103 includes, but is not limited to, observation data in the form of image, video or parameter. In the visual layout of the classroom, the symbol of the microscope 103 can also present the status of the microscope. The status of the microscope 103 and the status of the user smart terminal 102 can be combined to indicate the integrated status of the students operating the microscope to provide more information required for the digital teaching of the microscope. With the above configuration, teachers can easily obtain the corresponding relationship between students and the microscopes 103, thereby based on the correspondence between and the status of the user smart terminal 102 and the microscopes 103, teachers can know which student operates the specific microscope 103 at a specific position in the classroom.

According to the embodiment of the disclosure, the server 104 is connected to the management smart terminal 101, all of the user smart terminals 102 and all of the microscopes 103, respectively. The server 104 can monitor the status of all of the smart terminals, including but not limited to the connection status of whether the terminal is online or not, current position of the smart terminal in the classroom, and the microscope currently observed by the smart terminal, etc. The server 104 can also monitor the status of all microscopes (especially the cameras of the microscopes), including but not limited to the connection status of the camera and whether the microscope is online or not, etc. In general, the server 104 does not appear in the visual layout of the classroom presented in the display interface, but operates the classroom as a system platform and conducts data communication and exchange between all units. Thus, all communications between the management smart terminal 101, the user smart terminals 102 and the microscopes 103 are controlled by the server 104. For example, the server 104 forwards the commands sent by the management smart terminal 101 to the user smart terminals of students, including but not limited to blackening screen, locking, and Labscope setting, etc. The server 104 can also manage the access permission to microscopes of the students. The advantage of such configuration is that server 104 provides a unified interface for easy access management and extension.

The connections between the server 104 and other parts may be wired or wireless. Wired connections include dedicated cables or universal standard cables, such as USB, CABLE, etc. Wireless connections include but not limited to Bluetooth, Zigbee, WIFI, GSM, GPRS, WCDMA, LTE, and so on. The system 100 can use local area network, such as Ethernet, to achieve a visual teaching in small range, or be accessed into internet to achieve a remote visual teaching.

The server 104 can also include a storage device as a storage space for storing the classroom and a private storage subspace for individual smart terminal. The advantage of moving the private storage subspace of the management smart terminal 101 and the user smart terminal 102 to the server 104 is that when a certain smart terminal is disconnected from the system 100, the other smart terminals are still able to access the data stored by the disconnected smart terminal in the system 100. The storage device of the server can not only store files and offer corresponding storage space for each student, but also store configuration information related to the course.

According to the embodiment of the disclosure, the storage device of the server 104 can be provided as a separate database or a data server, or at least one of the storage space and the private storage subspace can be stored on a cloud. The advantage of using cloud storage is that the smart terminals can access the course-related data stored in the storage space and the corresponding private storage subspace from anywhere.

The visual teaching process according to the embodiment of the invention is detailed below.

Figure 3:
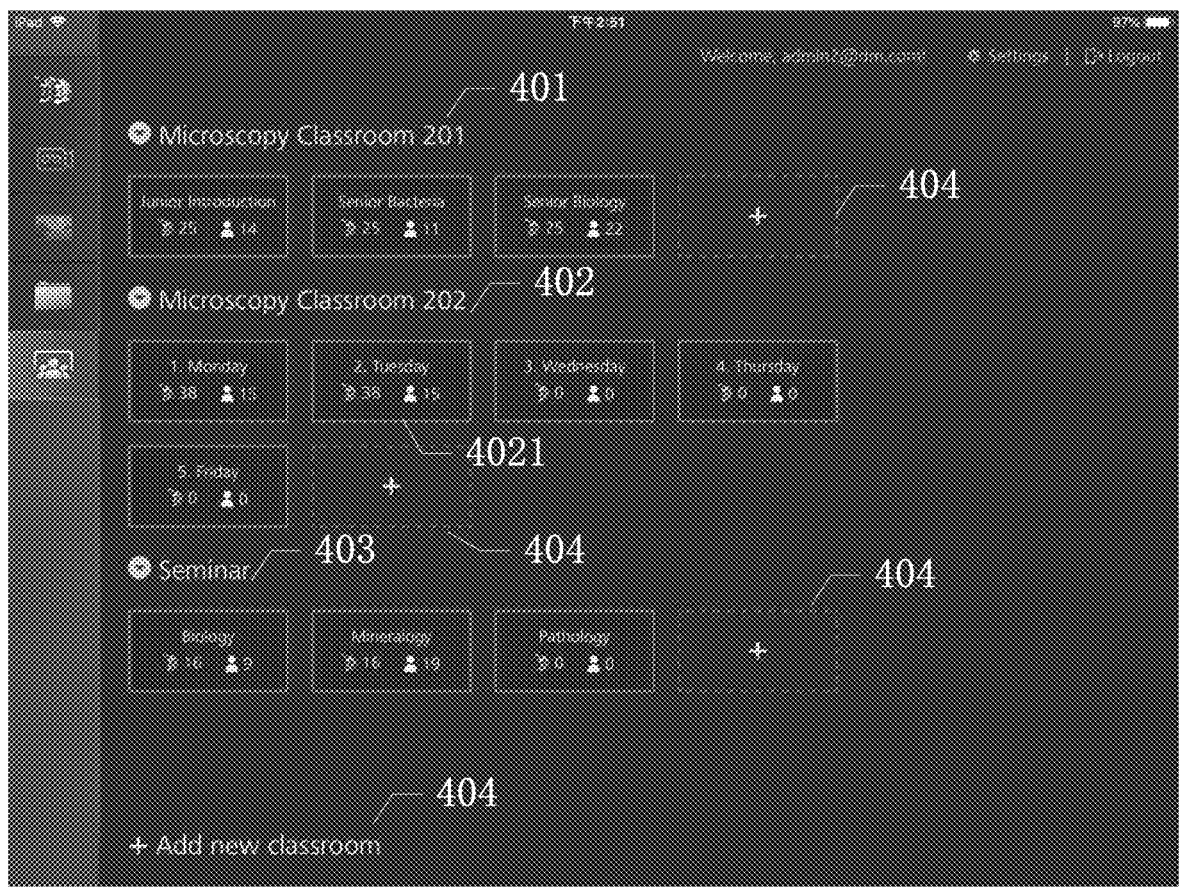
FIG. 3 shows the user interface of the management smart terminal of the visual teaching system when creating course and classroom according to one embodiment of this disclosure.

Teachers or administrators (such as the administrators of teaching institutions or the visual teaching system) establish a "classrooms" on a storage space or by the management smart terminal based on the physical environment of the teaching institutions (for example, more than one classroom containing microscopes), or based on the classrooms where microscopes can be equipped. As shown in FIG. 3, the teacher generates a user interface for the course and classroom on a management smart terminal. Assuming that there are three classrooms or classes in a teaching institution which have already been or need to be equipped with microscopes, a teacher or administrator can create a user interfaces for corresponding classrooms on the management smart terminal, including classrooms 401, 402, and 403. If the teacher or administrator needs to further establish a classroom, he or she can click "Add Classroom" option 404 at the bottom of the interface.

In one embodiment of the disclosure, the visual teaching system can create three different types of login accounts for teachers, administrators and students. Each type of accounts has different access permissions, and only the administrators have the authority to add, delete, or modify teachers. Teachers and administrators are in different user interfaces after logging in, and have different permissions too.

On the basis of the "classroom", the teacher or administrator can click the "Add Course" option 404 to further create new courses according to the teaching requirement, for example, "course" 4021. The interface proceeds to the user interface shown in FIG. 5 after clicking the "Add Course" option 404.

Figure 4A:
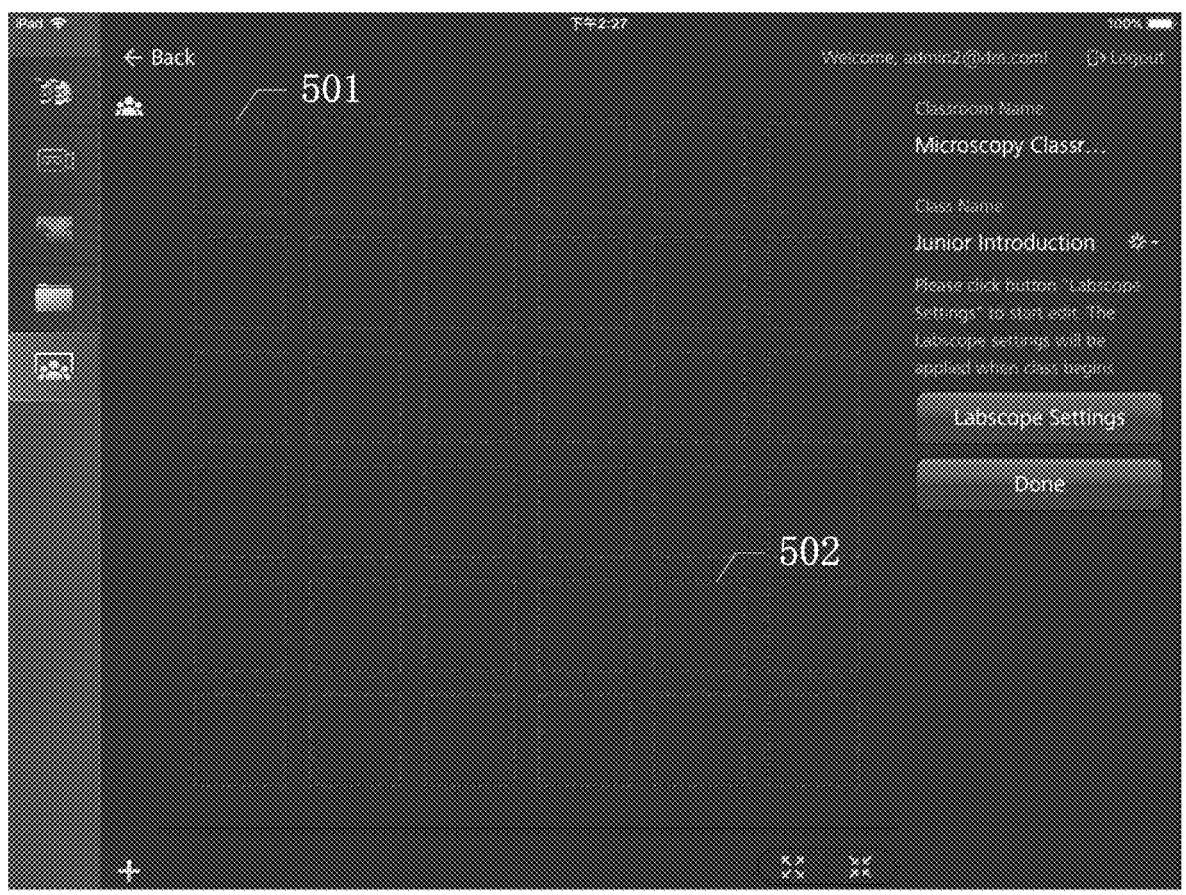
FIG. 4A shows the user interface for the classroom sub-interface of the management smart terminal of the visual teaching system according to one embodiment of this disclosure.

It is assumed that the geometric layout of the microscopes 103 in FIG. 2 is the geometric layout of microscopes in a real classroom. For the visual layout of the classroom, an administrator (such as an administrator of a teaching institution or a visual teaching system) can, in a space in form of grid group composed of grids (for example, 501 or 502)—"canvas" user interface (UI)—displayed in the classroom sub-interface of the management smart terminal as shown in FIG. 4A, place the microscopes, for example, by dragging and creating, in the corresponding grid, so as to set up the placement of the microscopes in the layout, according to the placement of microscope 103 in the actual classroom as shown in FIG. 2. It should be explained that the classroom sub-interface of the management smart terminal of the visual teaching system as shown in FIG. 4A is used to configure the classroom devices and the user interface of the students, which is the management interface used by the administrator to configure the microscope used for the course and to access the templates for students and courses. Preferably, the "canvas" can be infinitely expanded to accommodate the size requirements of classrooms. The classroom is located in the "canvas" on the layout and is set by the teacher or administrator. For example, the microscopes 103-1, 103-2 and 103-3 are arranged side by side, the microscopes 103-4 to 103-9 are arranged in a star-shaped form, and the microscope 103-0 used by the teacher is arranged separately. In case of a special requirement for course teaching, the microscopes 103-1 to 103-9 can also be located in different classrooms in reality. For the case that the microscopes 103 are in different classrooms in reality, the visual layout of the classroom can also present the geometrical arrangement of these microscopes 103.

Figure 4B:
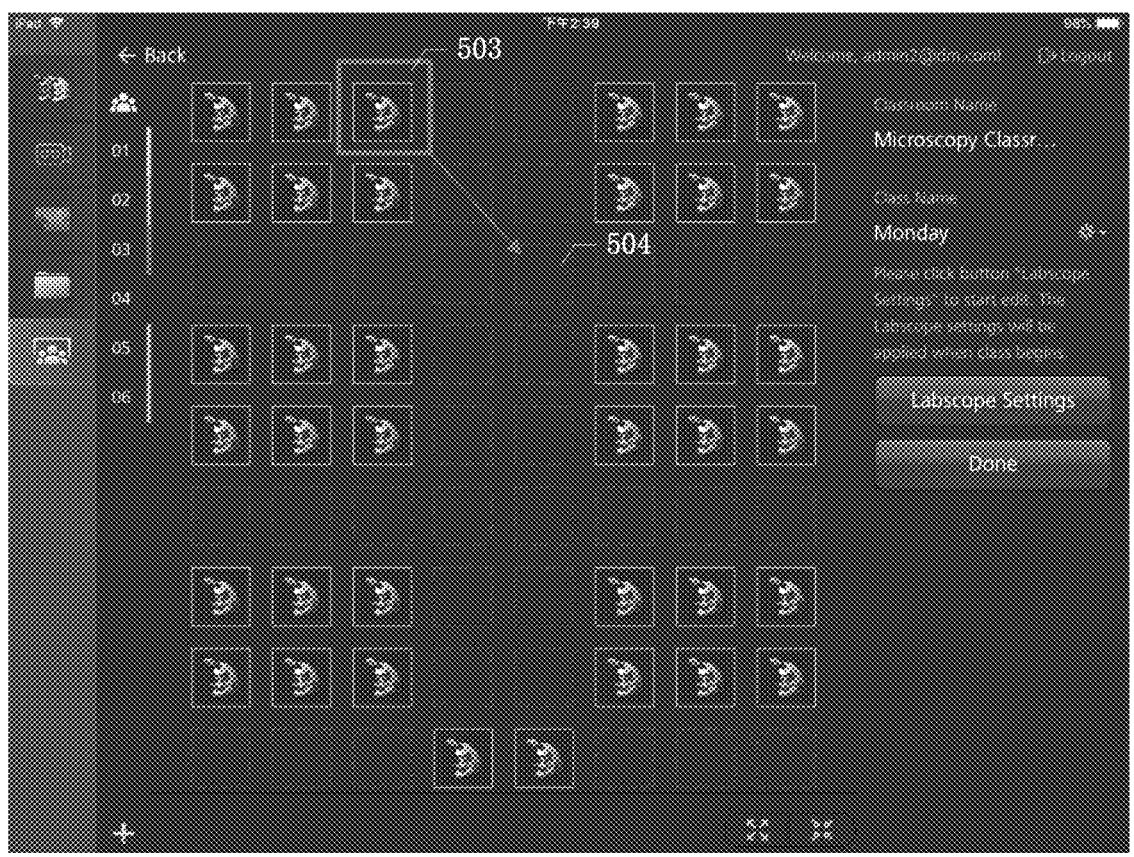
FIG. 4B shows the user interface for the classroom sub-interface of the management smart terminal of the visual teaching system according to another embodiment of this disclosure.

In the classroom sub-interface shown in FIG. 4B, the position of the microscope 103 in the layout of classroom on the "canvas" can be moved arbitrarily. For example, the microscope 103 can be dragged and placed from the position indicated by grid 503 to the position indicated by grid 504. If the microscope 103 is dragged to a location outside the current layout of classroom, the layout of classroom can be automatically extended on the "canvas" so as to cover the grid corresponding to the new location where the microscope 103 is dragged.

Figure 4C:
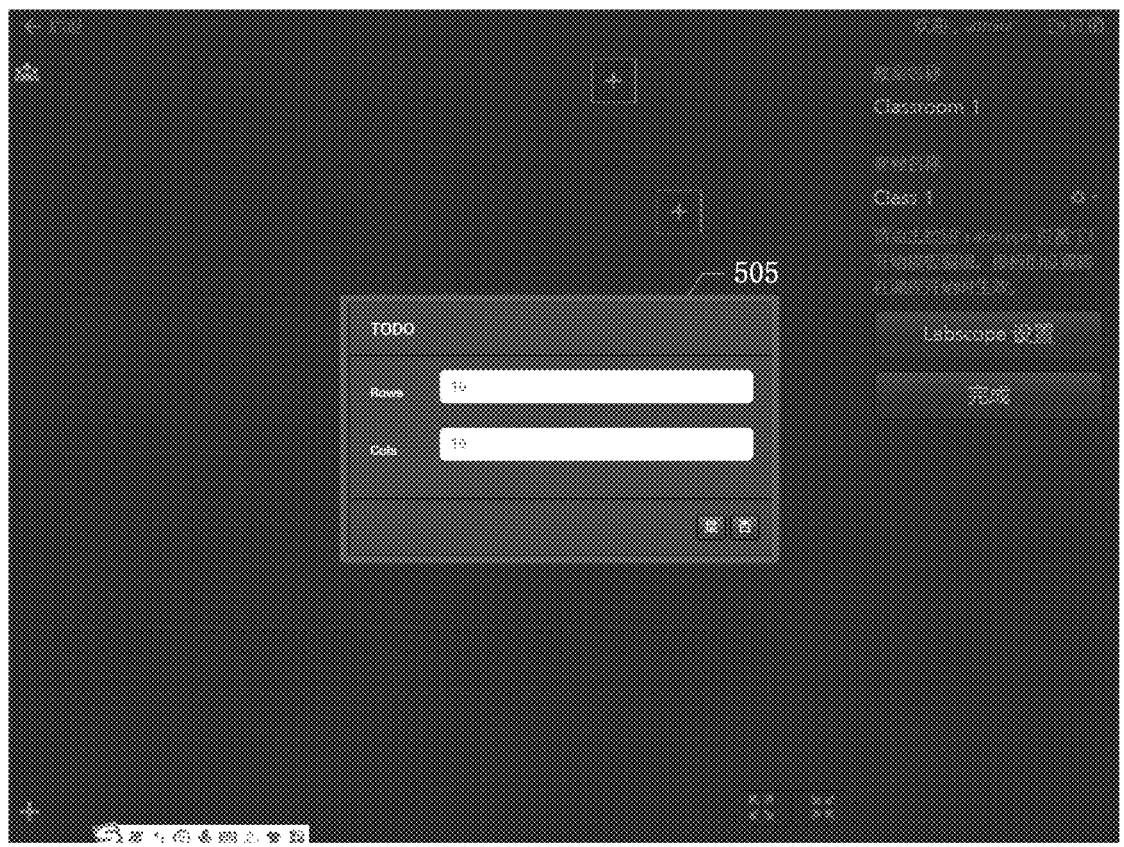
FIG. 4C shows the user interface for the classroom sub-interface of the management smart terminal of the visual teaching system according to another embodiment of this disclosure.

The layout size of classroom can be defined in advance or at any time. In another embodiment of the disclosure, before placing the microscopes 103 in the layout of classroom, the teacher or administrator can set the "canvas" by inputting the number of grids in the "canvas" (that is, grid group) included in the classroom layout, and the size and shape of the grid group consisting of grids. For example, the layout of classroom is set by defining the size of the grid group in form of grid matrix, that is, the number of rows and columns of the grid group. For example, in the classroom sub-interface shown in FIG. 4C, the layout of classroom is set to include 10 rows and 10 columns of grids through window 505. If teachers or administrators believe that the layout size of classroom is not large enough to arrange all of the microscopes 103, they can also resize the layout of classroom with the interface shown in FIG. 4C manually. For example, teachers or administrators can set and adjust the layout of classroom (that is, grid group or "canvas") by dragging the objects displayed on the GUI. The objects displayed on GUI correspond to the microscopes described above as teaching devices, the user smart terminals indicating students, boundaries of the grid group, etc. The object can be present in the form of a symbol, for example.

Figure 4D:
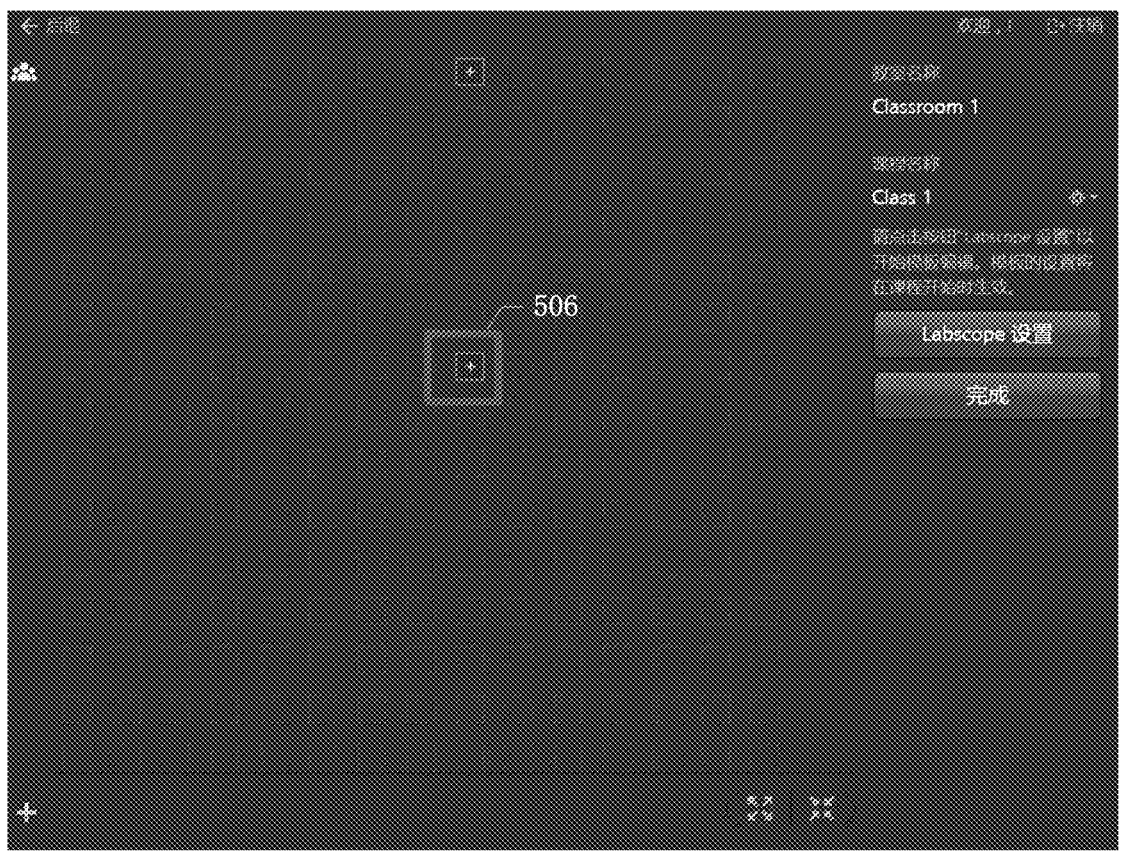
FIG. 4D shows the user interface for the classroom sub-interface of the management smart terminal of the visual teaching system according to still another embodiment of this disclosure.

FIG. 4D shows another exemplary classroom sub-interface. During the arrangement for the layout of classroom shown in FIG. 4D, each of the microscopes 103 is placed in a grid in the "canvas" with fixed and unmovable (non-dragable) position. The system will indicate that the microscope is placed wrongly, when the teacher or administrator realizes that the position of the microscope is inconsistent to the position in the actual layout of microscope in the classroom after they place the microscope 103 at a wrong position 506, or when the microscope is placed where other microscopes have been placed, or when the microscope is placed outside the layout of the classroom. At this point, the teacher or administrator must remove the microscope 103 from the wrong position and re-add it at a correct position. For example, the microscope 103 can be placed at a position where no microscope has been placed, or the layout of classroom can be resized to provide more free positions for the microscope.

Figure 5:
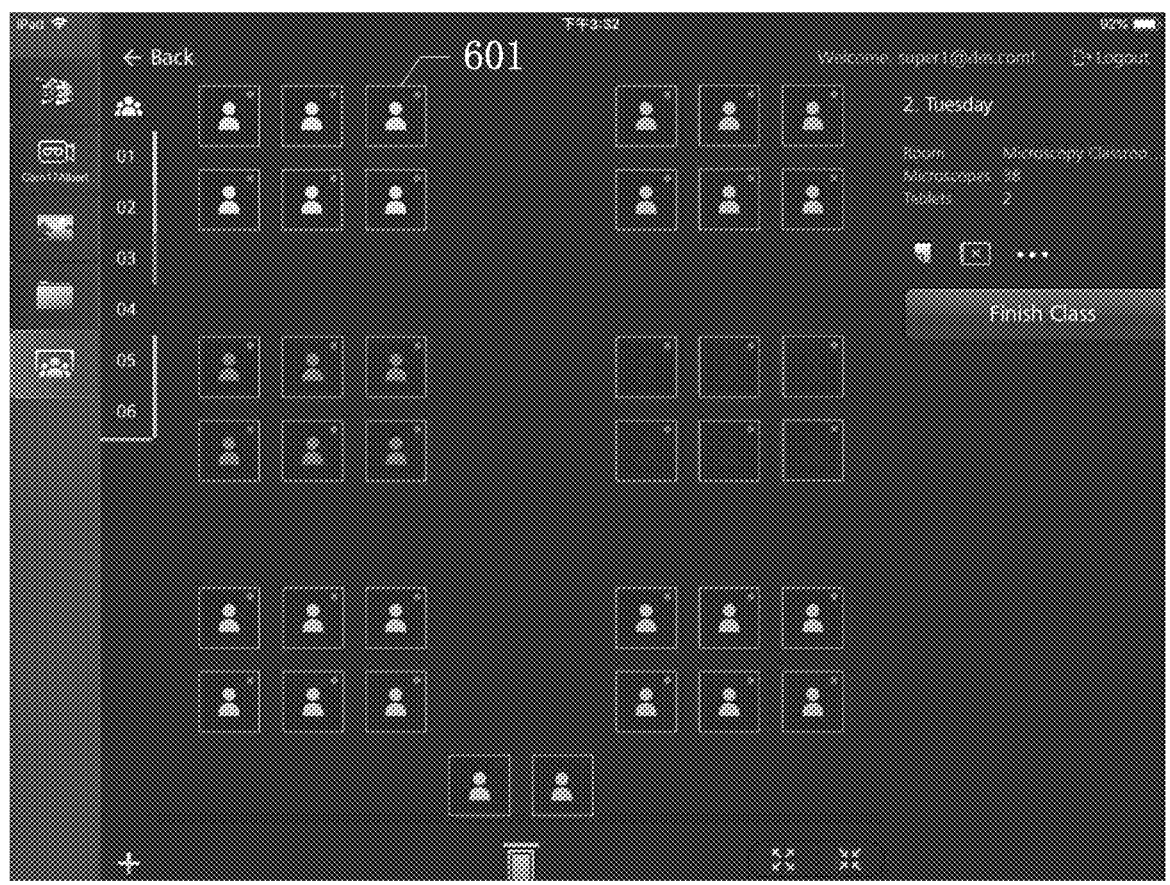
FIG. 5 shows the user interface about an overview of the distribution of devices and the login status of students in the classroom after the teacher begins the course of the management smart terminal of the visual teaching system according to one embodiment of this disclosure.

After configuring the position of the microscopes 103 in the "classroom", the teacher or administrator further chooses the students corresponding to the specific microscope 103 for the location of the microscope and assigns the corresponding login account to each student based on the list of names and/or IDs of the students who anticipating the course. Upon configuration, the interface shows the layout of students assigned with microscopes in the classroom as shown in FIG. 5. The administrator can set corresponding student for each position of microscope, for example, the student 601 sits in the microscope area at the upper left corner. For one microscope 103, it can be configured to correspond to one or more students, or there is no student at one or more positions of microscope. In the embodiment shown in FIG. 4B, the positions of students in the layout of classroom can be arbitrarily moved similarly to the positioning of the microscopes 103. The corresponding relationship between students and microscopes can be configured by placing the user smart terminals used by students in the grid group. Similarly, the teacher and/or administrator can set and adjust the corresponding relationship between students and microscopes by dragging the objects displayed on GUI representing students or the user smart terminals used by the students.

According to the embodiment of the disclosure, a classroom 403 for seminar can be established as shown in FIG. 3 except for normal classrooms. Compared with common courses, the seminar focuses more on the interaction between teachers and students. More interactive functions can be set for the seminar at the management smart terminals and the user smart terminals.

The setup and management for classroom can be done via the management smart terminal of teachers. Teachers may have independent permissions and contents in their own course. According to the embodiments of disclosure, the visual teaching system can also include a supervisory smart terminal used by administrators for underlying settings of the system and configuration for the management smart terminal. The functions of the supervisory smart terminal can be performed through the account mechanism, for example, through the configuration by administrators logging in with the administrator account via the management smart terminal.

The basic configurations of the server for establishing a classroom can include, for example, parameters for data communication between the server and each of the smart terminals as well as microscopes, control and drive functions of microscopes, basic settings of the server for operating the visual classroom, functions of the management smart terminal, and the display of user interface, etc.

After configuring all of the classrooms and the classroom-related courses, it can be seen in the user interface as shown in FIG. 3 that, for example, there are fifteen students operating 38 microscopes in a class at classroom 402, called "Microscopy Classroom 202" on Tuesday. It should be understood that the numbers of students and microscopes are different in each course.

In another embodiment of this disclosure, each of the students and teachers may operate a separate microscope or operate more than one microscope through their corresponding smart terminals respectively.

Teachers can prepare for the corresponding courses before teaching. For example, the classroom can provide microscopy teaching experiments such as cytology, biomolecules and materials science, and teachers can prepare courseware for corresponding courses. The courseware includes lecture notes, experimental procedures and precautions, contents and data needed to be referenced in previous courses, as well as the teacher's own experimental data and class preparation notes, which need to be exhibited to the students.

Figure 6:
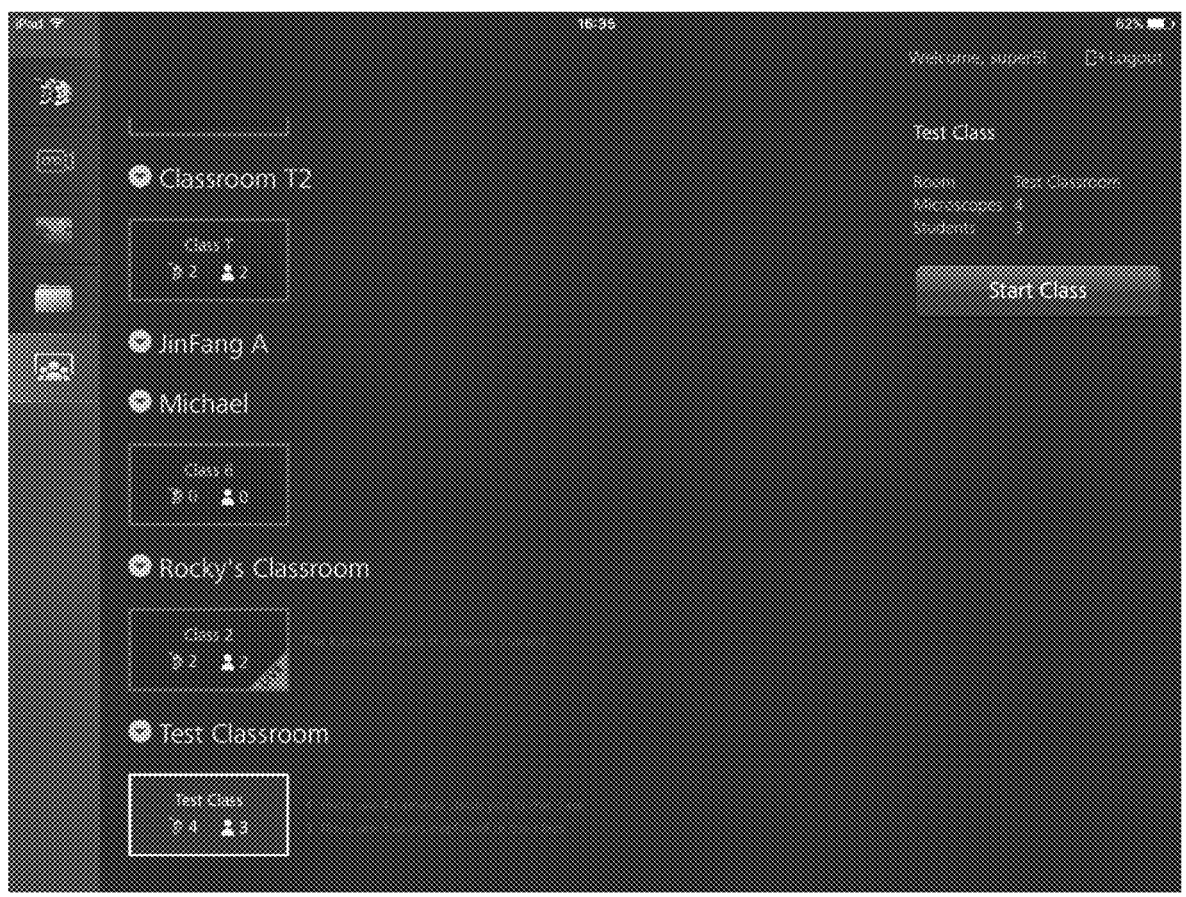
FIG. 6 shows the user interface for course selection of the management smart terminal of the visual teaching system according to one embodiment of this disclosure.
Figure 7:
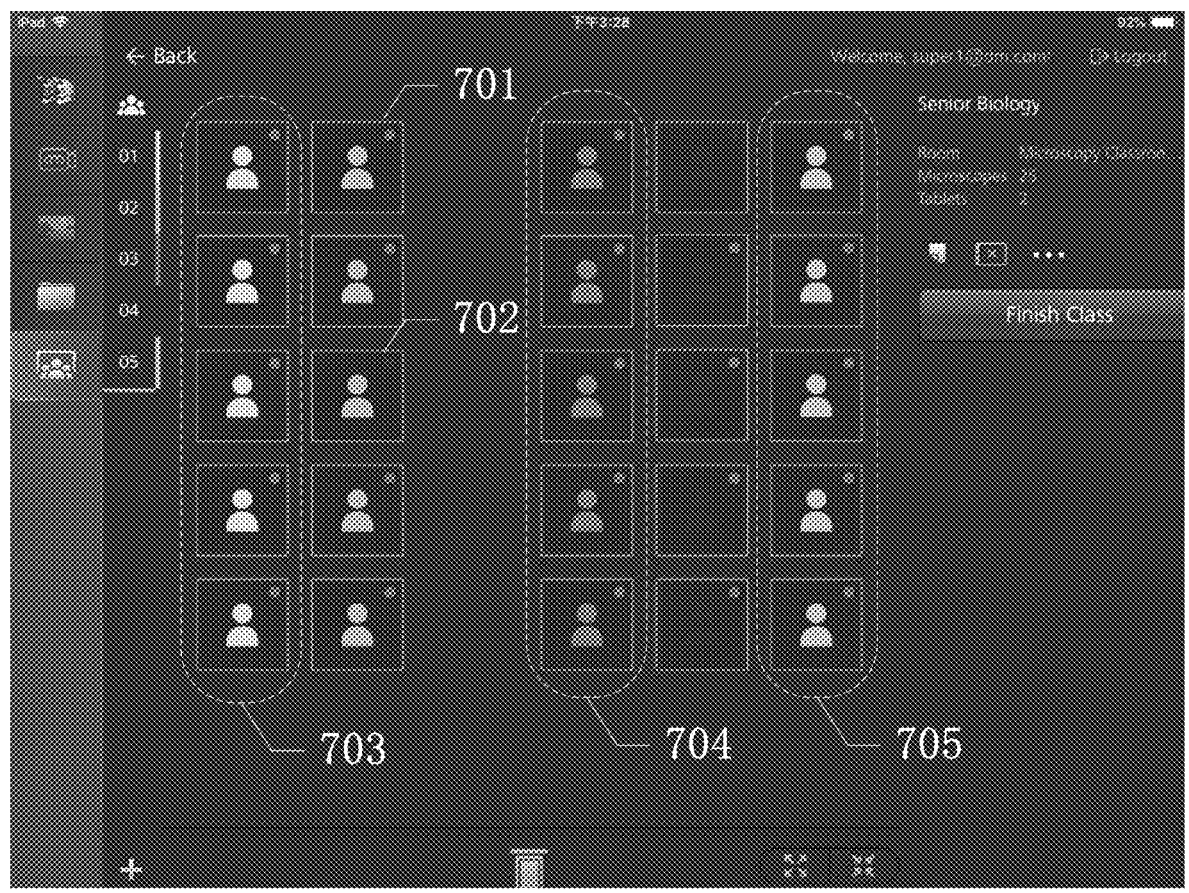
FIG. 7 shows the user interface for the classroom sub-interface of the management smart terminal of the visual teaching system according to one embodiment of this disclosure.
Figure 8:
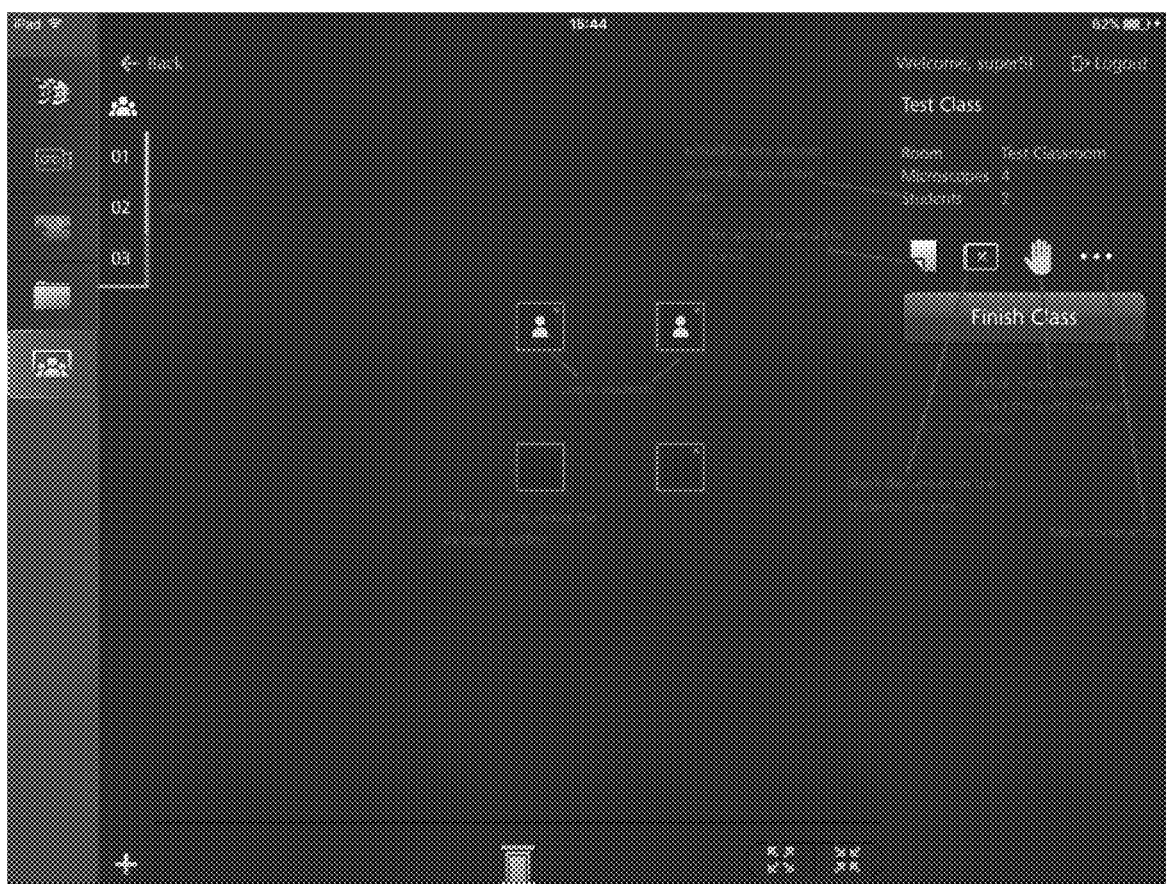
FIG. 8 shows the user interface about the status of logged in students in the classroom sub-interface of the management smart terminal of the visual teaching system according to one embodiment of this disclosure.

As shown in FIG. 6, the teacher can click the corresponding course in class. The classroom with the symbol of "live" (Rocky's Classroom) indicates that the classroom is being used by other teachers (in class) currently. The other courses in the current classroom are not allowed to be used at this time, but the teacher can choose the ongoing course and participate in the class. This is followed by the interface for layout of student/microscope as shown in FIG. 5, where the teacher can easily associate the positions and status of the students as well as the microscopes in the interface of the user smart terminals with the actual positions of the students and/or microscopes in the real classroom, based on the correspondence relationship setup between the students and microscopes and the layout correspondence relationship between the positions of students and microscope in the real classroom. In the classroom sub-interface shown in FIGS. 7 and 8, if there is a human shaped mark on the user symbol of student 701 and the mark is in green, it means that the student 701 is online; if the mark is in gray, it means that the current student is offline. If the mark at the upper right corner of the user symbol of the student 701 is in green, it indicates that the microscope and/or camera of the microscope corresponding to the student 701 are working properly. If the mark at the upper right corner of the user symbol of the student 702 is in red, it indicates that the microscope and/or camera of the microscope corresponding to the student 702 are out of work. If there is no human shaped mark on the user symbol, it means that the microscope is in no connection with any user smart terminal. If there is more than one human shaped mark on the user symbol, it means that the microscope is in connection with more than one user smart terminal used by students. If more than on human shaped mark on the user symbol is in gray, it means that some students are offline. Usually the students' online status or current behavior is obtained by detecting the user smart terminals used by students.

According to an embodiment of the disclosure, those microscopes and students which are not selected in the classroom for the course may not be displayed in the layout of classroom, that is, those microscopes not being used and the user smart terminals of students who do not anticipate the course are not displayed in the "canvas" or layout of grid group of the classroom. According to another embodiment, those microscopes not being used and user smart terminals of students who do not anticipate the course can be displayed in a way different from the way that microscopes being used in the course and the user smart terminals of students who anticipate the course are displayed.

After the creation of the course, the teacher will determine the requirements of the course, according to which the teacher can establish a corresponding classroom. The configuration for classroom includes, but is not limited to: basic settings of a server required to establish the classroom, the microscopes to be used in the course and the students who anticipate the course, access permissions of the user smart terminals of students to each of the microscopes, access permissions of the user smart terminals of students to the management smart terminal of the teacher and to other user smart terminals of students, the functions of the user smart terminals of students, grouping of students and microscopes, access permissions of the user smart terminals of students in group and of the microscopes in group based on the grouping, establishment of the storage space as well as private storage subspace to be used by the user smart terminals of each student and the management smart terminal, the setting of access permissions of the storage space and private storage subspace, etc.

Figure 9:
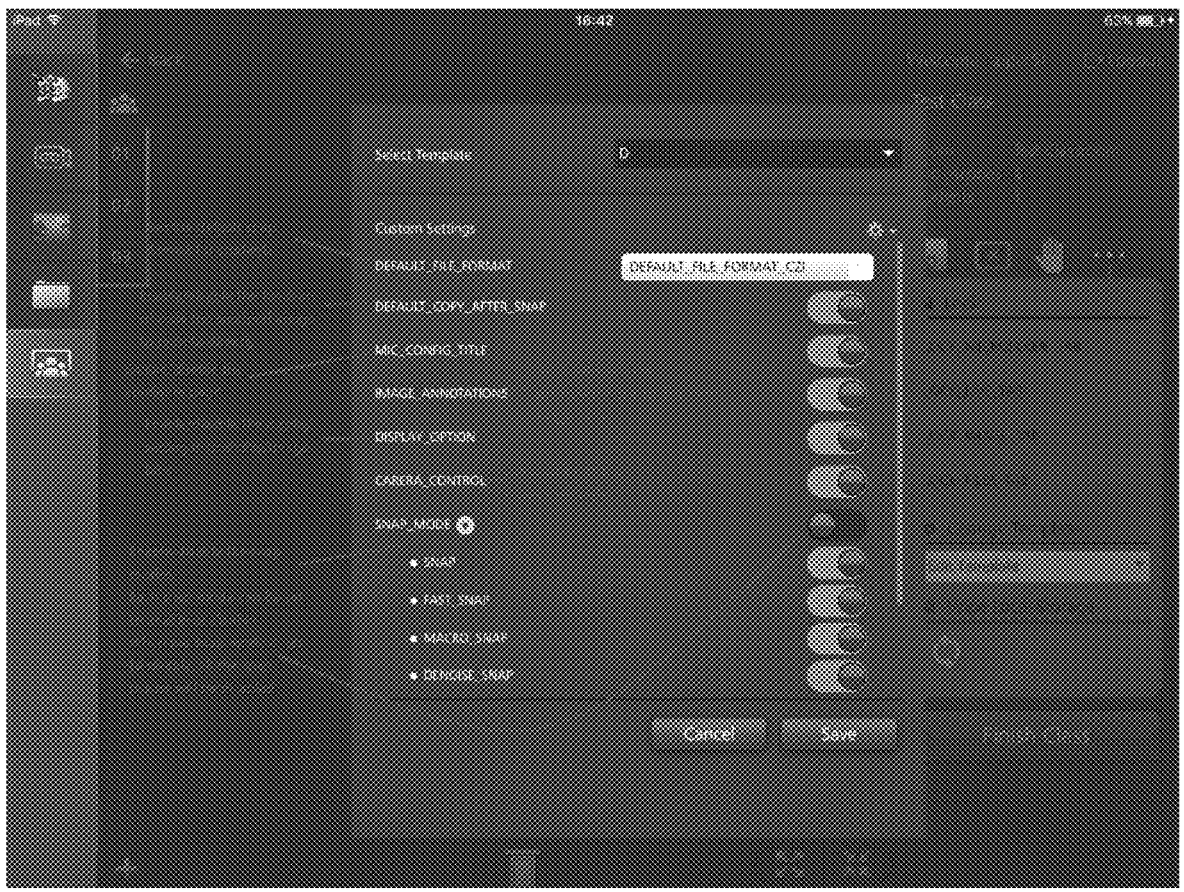
FIG. 9 shows the user interface for permission setting of the management smart terminal of the visual teaching system according to one embodiment of this disclosure.
Figure 10:
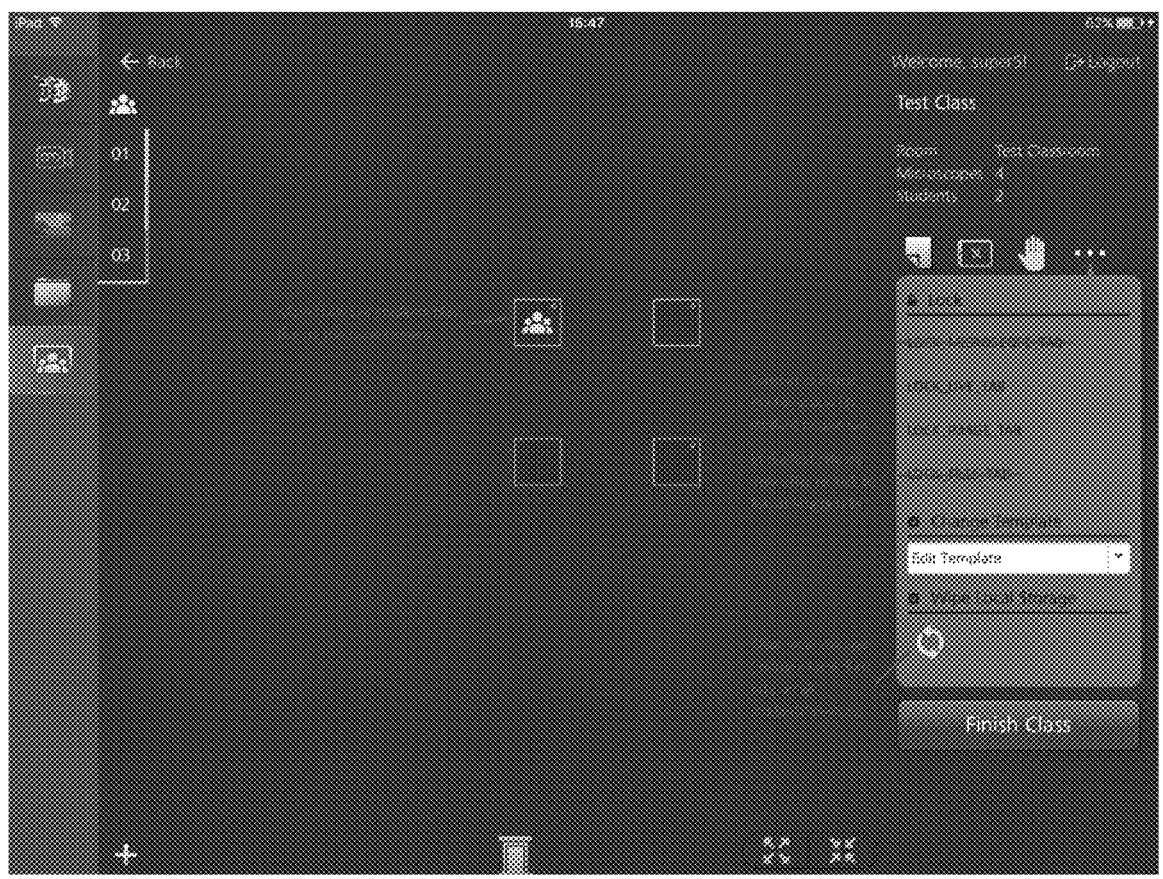
FIG. 10 shows the user interface for permission settings of the management smart terminal of the visual teaching system according to one embodiment of this disclosure.

FIG. 9 and FIG. 10 show the user interface for permission setting of the management smart terminal of the visual teaching system according to one embodiment of the disclosure.

The administrators of a teaching institutions or visual teaching systems can pre-configure the templates that may be used in the course through the interface for administrator, and all teachers who use the course can directly select the required templates in the drop-down list. If the teacher needs a customized template, he or she can select the "Edit Template" option in the drop-down list. The template management window will appear in the interface, and the teacher can save the customized template, as shown in FIG. 9. The line of "Select Template" shows name of the current template, "D". If the gear symbol on the lie of "Custom Settings" is clicked, options will be popped up to remove or rename the current template. The teacher can limit the formats of pictures taken by students by selecting "DEFAUL_FILE_FORMAT", where the formats, for example, include CZI, JPG, TIF, CZI+JPG or CZI+TIF. The teacher can set "DEFAULT_COPY_AFTER_SNAP" to be enabled, so that the pictures taken by the students will be copied and sent to their network folders directly.

The teacher can further set to enable or disable certain functional modules, such as microscope settings, graphic marking, display settings menu, camera settings and shooting modes. For shooting, some specific or all shooting modes can be selected to be disabled.

The templates can be applied to all students or some designated students.

In order to prevent students from performing irrelevant operations in the course, the teacher can blacken the screen of the smart terminals of all students or some designated students or lock the smart terminals to a designated interface.

For the users using public smart terminals, the teacher can clear all local files on the smart terminals of the students for privacy protection.

The palm symbol is used to clear the students' hand raising status shown in the interface.

According to the embodiment of the disclosure, teachers can also set the functions of the user smart terminals used by students. In addition to operating the microscope and acquiring its status information, obtaining data from other smart terminals, devices and server, accessing the smart terminals of other users and the management smart terminals according to access permissions, and accessing the storage space and private storage subspace according to access permissions, the user smart terminal can also be added with more functions according to the requirements of courses. For example, the user smart terminal can provide more social interaction functions in the seminar classroom 403 as shown in FIG. 3. Moreover, the user smart terminal provides the function of raising hands to ask questions to the teacher. When the students use the hand-raising function of the user smart terminals, the request can be sent to the management smart terminal by a social module with a relatively high priority. Correspondingly, the management smart terminal of teachers can also provide the function of questioning students similar to "roll call".

The teachers can also set the access permissions of students to the management smart terminal and the user smart terminals of other students. Based on the access permissions of the smart terminals, the students can operate the corresponding microscopes by accessing the user smart terminals of other students or obtain the contents shared by other students on the user smart terminals. In general, the management smart terminal of teachers has the access permission to all the user smart terminals of the students and to all microscopes for the purpose of monitoring, whereas the students can only access the smart terminals of other students or teachers under authorization.

It should be understood that the data exchange between the management smart terminal and the user smart terminal is forwarded by the server. The server does not forward the data from microscope generally. Usually the access permissions of students to microscopes are granted by setting the access permissions to the user smart terminals used by the students.

After arranging the geometric layout of microscopes and students, the teachers can set the access permissions of students and microscopes. For example, one or more students can operate one or more microscopes, or one or more microscopes can be operated by one or more specific students. Access permissions to the operation include, but are not limited to, adjusting the mechanical action and parameters of the microscope, setting electronic function, checking the microscope images, and obtaining the results of the microscope, etc.

According to the embodiment of the disclosure, the teachers can further group the students and microscopes according to the requirements of the course, and set different access permissions to the students and microscopes in each group. Taking the layout diagram in FIG. 2 as an example, the students corresponding to the user smart terminals 102-1 to 102-3 of microscopes 103-1 to 103-3 can be set as a student group 105, and these microscopes can also be set as a corresponding microscope group 105. Similarly, the students corresponding to the user smart terminals 102-4 to 103-9 of microscopes 103-4 to 103-9 can be set as a student group 106, and these microscopes can also be set as the corresponding microscope group 106. According to another embodiment, grouping may not be carried out according to the geometric layout of the microscopes. For example, the group 106 of the microscopes and the students can include microscope 103-1 and the students corresponding to the user smart terminal 102-1. It should be understood that the students and microscopes may not be grouped in one-to-one correspondence relationship, that is, the microscopes operated by the students in the same group may not belong to the same microscope group, and the microscopes in the same group may not be operated by the students in the same group.

Group selection is based on course requirements. In an embodiment, the cytology course being conducted in the classroom consists of two groups of experiments, each with different microscopes and different corresponding students. The students and microscopes can be grouped according to the types of experiments in the course. In another embodiment, both the cytology and biomolecular experiments are conducted in the classroom at the same time, so students and microscopes can be grouped according to the two types of experiments. In the real classroom, microscopes and students involved in different types of experiments may be intersected. Such situation can be reflected intuitively in the classroom sub-interface of the disclosure, and students operating these microscopes can be accurately grouped.

The teachers can send message (such as "roll call") and the information of their corresponding microscope 103 to a particular group individually, and set the access permissions of students and microscopes based on grouping. For example, the students in a specific group can access the microscopes in the specific group or one or more ungrouped microscopes; the microscopes in a specific group can be accessed by the students in the specific group or one or more ungrouped students. Similar to the case of non-grouping, the user smart terminals of the students in a specific group can have different access permissions to the user smart terminals of other students or grouped students and the management smart terminal.

Figure 11:
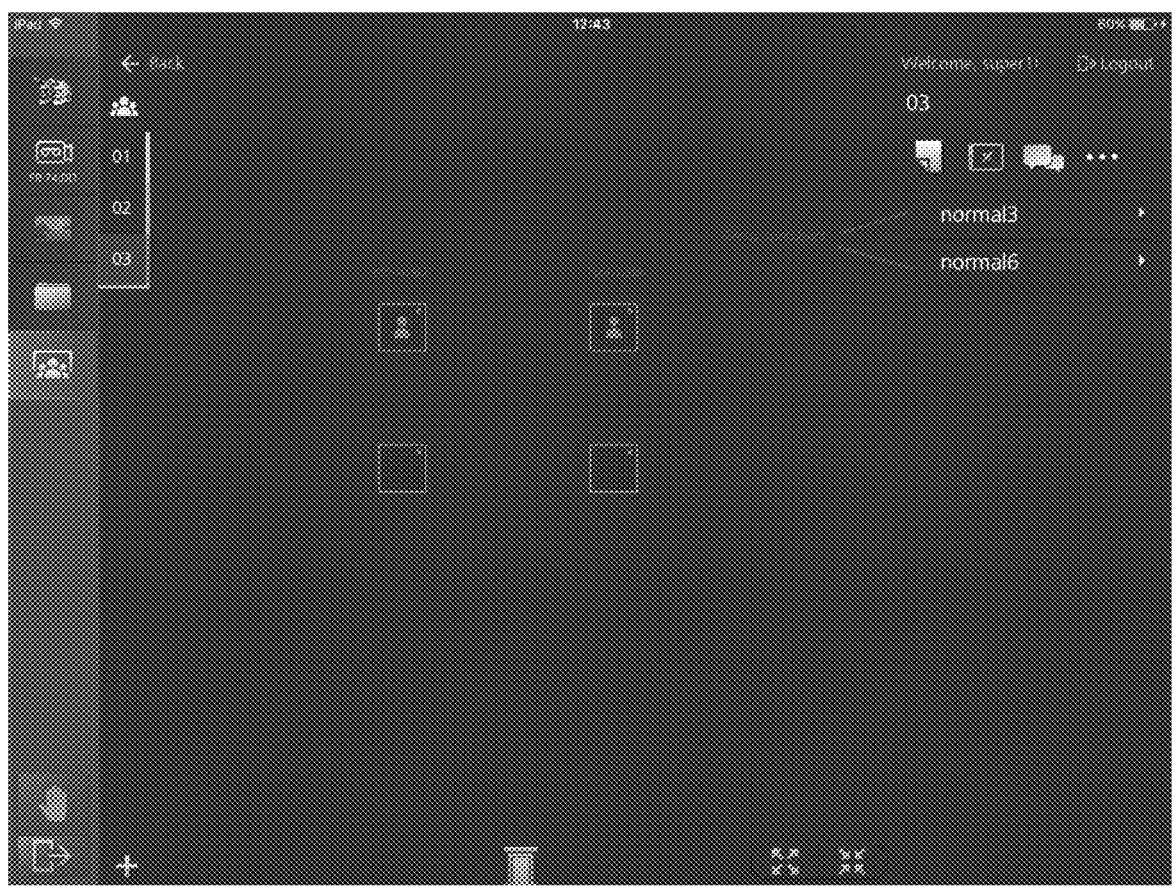
FIG. 11 shows the user interface for grouping of the management smart terminal of the visual teaching system according to one embodiment of this disclosure.
Figure 12:
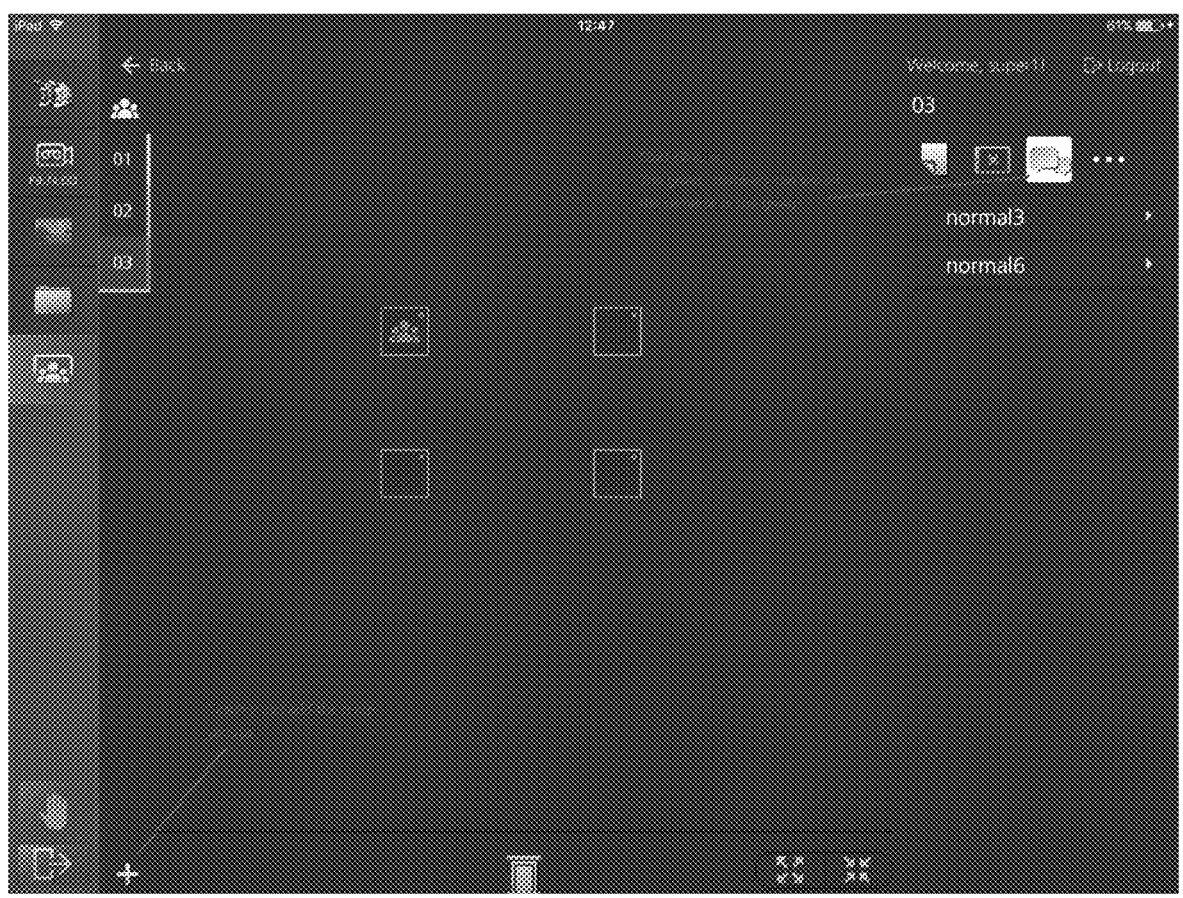
FIG. 12 shows the user interface for grouping of the management smart terminal of the visual teaching system according to one embodiment of this disclosure.

As shown in FIGS. 11 and 12, the administrators can set the groups 01, 02, 03 in FIG. 11 in advance when configuring a course. The administrators can rename each group, and the server automatically assigns different colors to each group. When a group is selected, the symbols of the group members appear in the color of the group. As shown in FIG. 11, when group 03 is selected, the students "normal 3" and "normal 6" in FIG. 12 appear in the color of group 03, and are assigned to a microscope respectively.

The teachers can click on the discussion button, and then the students "normal 3" and "normal 6" will see all the microscopes that are selected to group 03. FIG. 12 shows the case that the user smart terminals of the students "normal 3" and "normal 6" are connected to the same microscope commonly for observation after the discussion begins.

Figure 13:
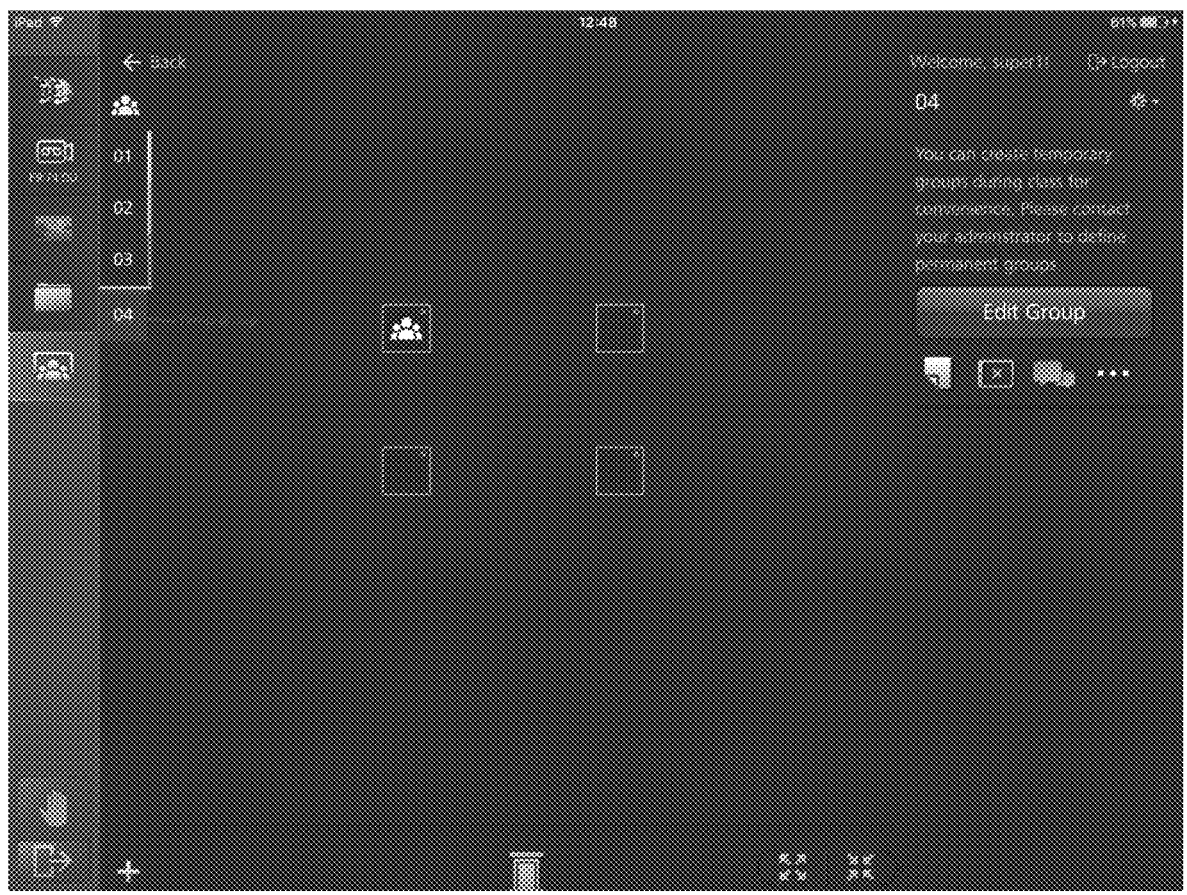
FIG. 13 shows the user interface for grouping of the management smart terminal of the visual teaching system according to one embodiment of this disclosure.

The teachers can create a temporary group in course according to their own needs, but the temporary group will not be saved after the end of the course. As shown in FIG. 13, the teacher adds a temporary group 04.

When a teacher chooses a group, he or she can send various instructions, but all instructions are effective to the members in the group only.

With the above settings, the teachers can set access permissions and the function of the user smart terminal of a student, a group of students or all students by the management smart terminal. They can also set access permissions to a microscope, a group of microscopes or all microscopes. It should be noted that the grouping and permission settings to students and microscopes are effective to the corresponding courses generally. The grouping and permission settings between different courses in different classrooms are not shared, that is, the students who anticipate different courses are not able to access the data of each other in general, nor can the microscopes operated by the students be interchangeable between each other, unless the teachers or administrators set in particularly. During the course, the teachers can also perform more control to these different ranges of students or microscopes, as detailed below.

According to the embodiment of the disclosure, the teachers can also set up storage space in the classroom subinterface and further set up the private storage subspace for the management smart terminal of teachers and the user smart terminals of each student by the management smart terminal. The storage space is used to store all of the data and information of the courses conducted in the classroom, including public data and information that can be accessed by the teachers, all of the students, all of the microscopes and the servers, and private data and information that can be accessed by the teachers and all of the students individually. The public data, for example, can be stored in the public storage space of the storage space. The private data and information are stored in the private storage subspace of the storage space. The teachers and students access storage space for public data and information, and access private storage subspace for private data and information, by the management smart terminal and the user smart terminals, respectively. The private storage subspace can be accessed by the smart terminals of the users other than the owner of the private storage subspace under access permission. For example, a teacher can access the private storage subspace of all of the students by the management smart terminal, or access the private storage subspace of a particular student if the student permits. The students can also access the private storage subspace of each other by their user smart terminals under permissions.

According to the embodiment of the disclosure, the size of space, storage location and access permissions of the storage space and the private storage subspace are assigned based on the course requirements. Based on the organization of the courses, the teachers can store the public courseware required for courses, operation specifications and precautions of microscopy, demonstration of display operations, images and data, and other contents that can be learned by the students in other similar courses, etc. in the storage space. The teachers can put their class preparation notes, experimental data and images in their private storage subspace. The students can put their experimental data and images, course notes and related documents in their private storage subspace. Separate folders can be set in the storage space and the private storage subspace automatically according to each course, so that the content in those folders can be shared with others during the course.

For file and data sharing, the teachers can set access permissions to the storage space and the private storage subspace for teachers and students based on the course requirements and grouping. When the students are grouped, the access permissions to the storage space and the private storage subspace can be set for the groups. When the files and data in the storage space and/or the private storage subspace are stored in the form of folders, different access permissions can be set for different folders. The students can also set access permissions to their own private storage subspace for other students and teachers based on the course. The teachers and students can also have permissions to store the public data and information from the storage space into their own private storage subspace and to store the information from their private storage subspace into the storage space as public data.

The storage space and private storage subspace can be located on a storage device of the server of the visual teaching system or a separate database or storage device, or in other locations, such as cloud. The cloud storage can consist of both public and/or private clouds. The storage space and private storage subspace are configured based on the course requirements. In an embodiment of the disclosure, the private storage subspace can be arranged in the storage device inside the management smart terminal of the teacher and the user smart terminals of the students. The management smart terminal and the user smart terminals can synchronize data of the private storage subspace with the data in the local storage device unidirectionally or bidirectionally by local or cloud synchronization.

Figure 14:
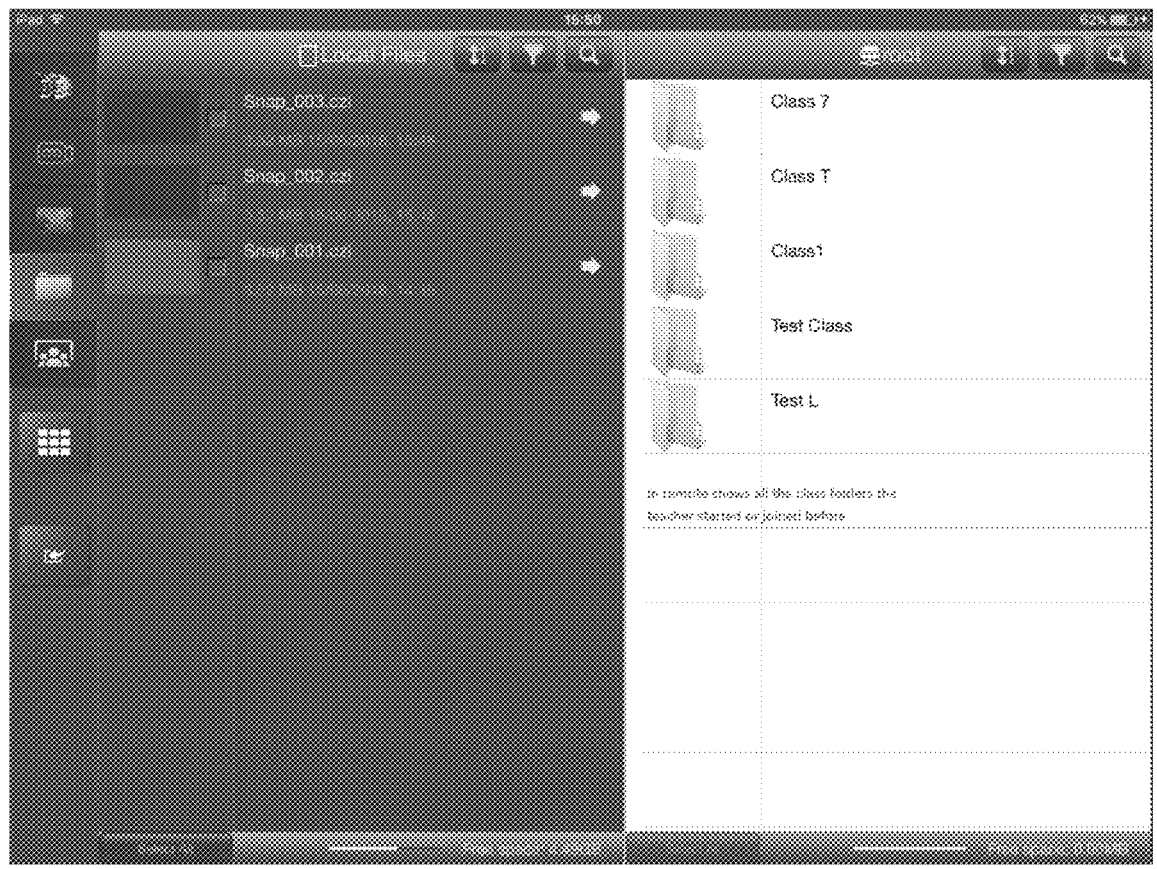
FIG. 14 shows the user interface for file storage of the management smart terminal of the visual teaching system according to one embodiment of this disclosure.
Figure 15:
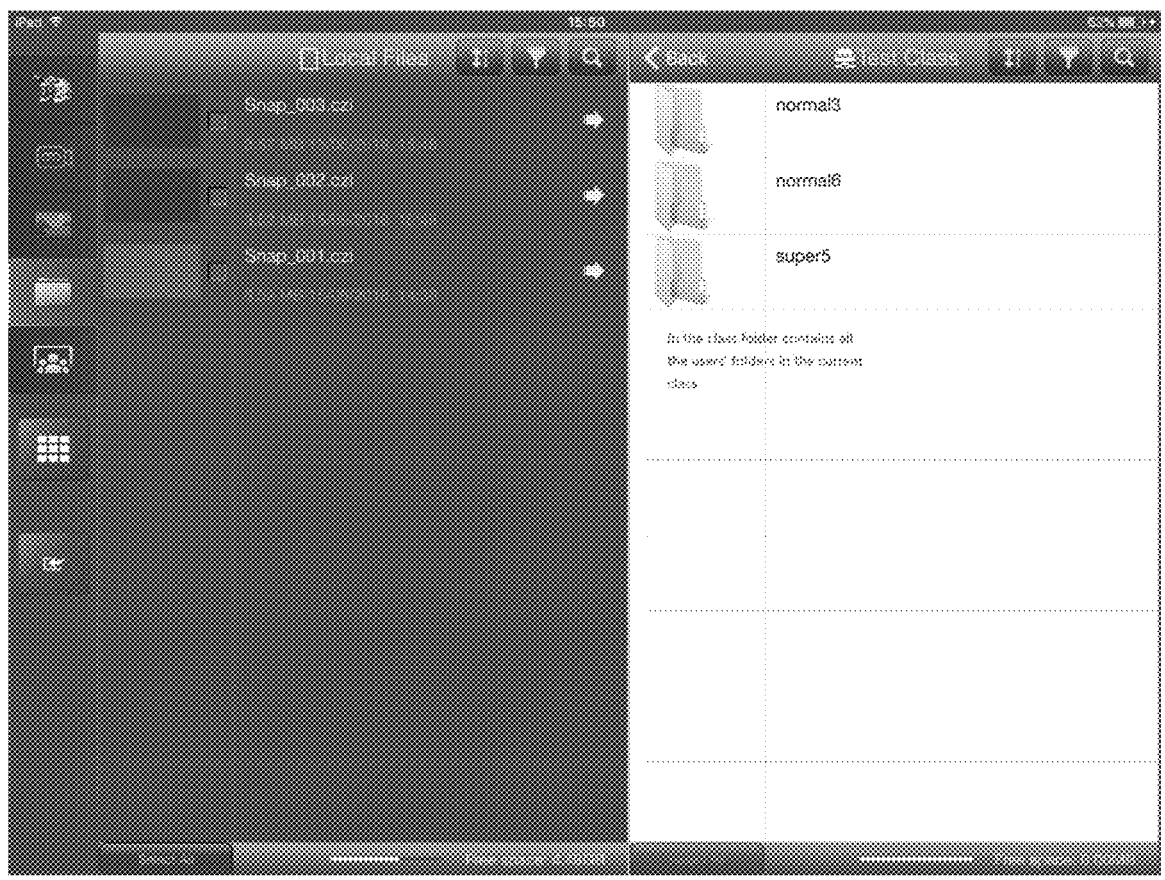
FIG. 15 shows the user interface for file storage of the management smart terminal of the visual teaching system according to one embodiment of this disclosure.
Figure 16:
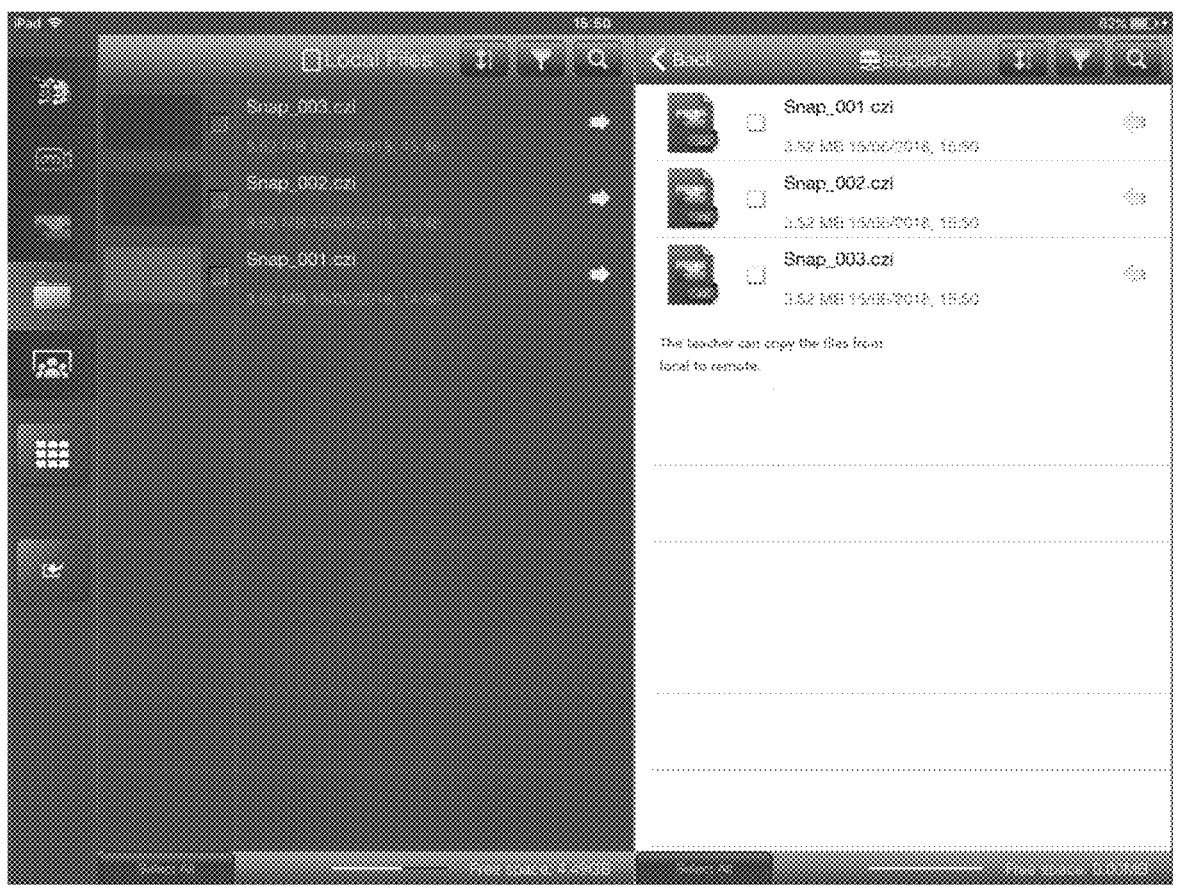
FIG. 16 shows the user interface for file storage of the management smart terminal of the visual teaching system according to one embodiment of this disclosure.

As shown in FIG. 14, all previous and current course folders will be displayed in the root directory of server of the file page after the teacher logs in. If the teacher selects a folder to enter, such as the folder corresponding to the ongoing course "Test Class", as shown in FIG. 15, the subfolders listed under the folder are the folders of all members anticipating the current course. Thus the files that the members upload for the course to the server are displayed in their respective folders. The teachers have the permissions to upload or download files from or to all subfolders. FIG. 16 shows that the teacher uploads the file to his own folder with respect to the course.

If the login account is of a student, the folders of all the courses anticipated by the student will be displayed in the root directory of the server, and the files uploaded by the student or the teacher will be displayed in the subfolders with respect to each course.

Figure 17:
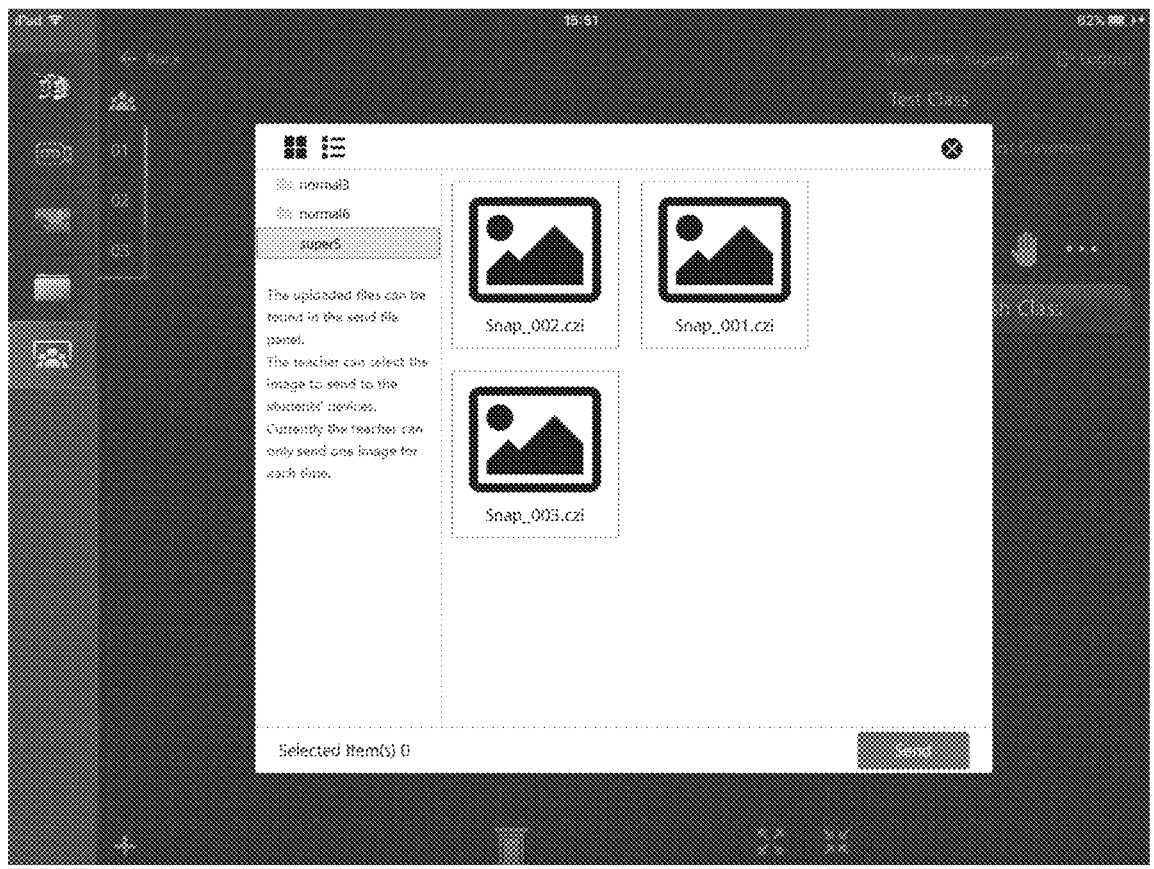
FIG. 17 shows the user interface for file sending of the management smart terminal of the visual teaching system according to one embodiment of this disclosure.

FIG. 17 shows the file window opened by the teacher in the course interface. On the left side of this window is the folder for all the members anticipating the current course. When the teacher clicks on any folder, all of the files in that folder will be displayed on the right side of the window. When the teacher selects the file and then clicks the sending button, the file will be downloaded automatically into the local folders of all of the targeted students. If the operation is performed in the whole range of the classroom, the targeted students are all of the online students; if it is operated at the group level, the targeted students are all of the online students in the group; if it is operated for a single student, the targeted student is this student.

Figure 18:
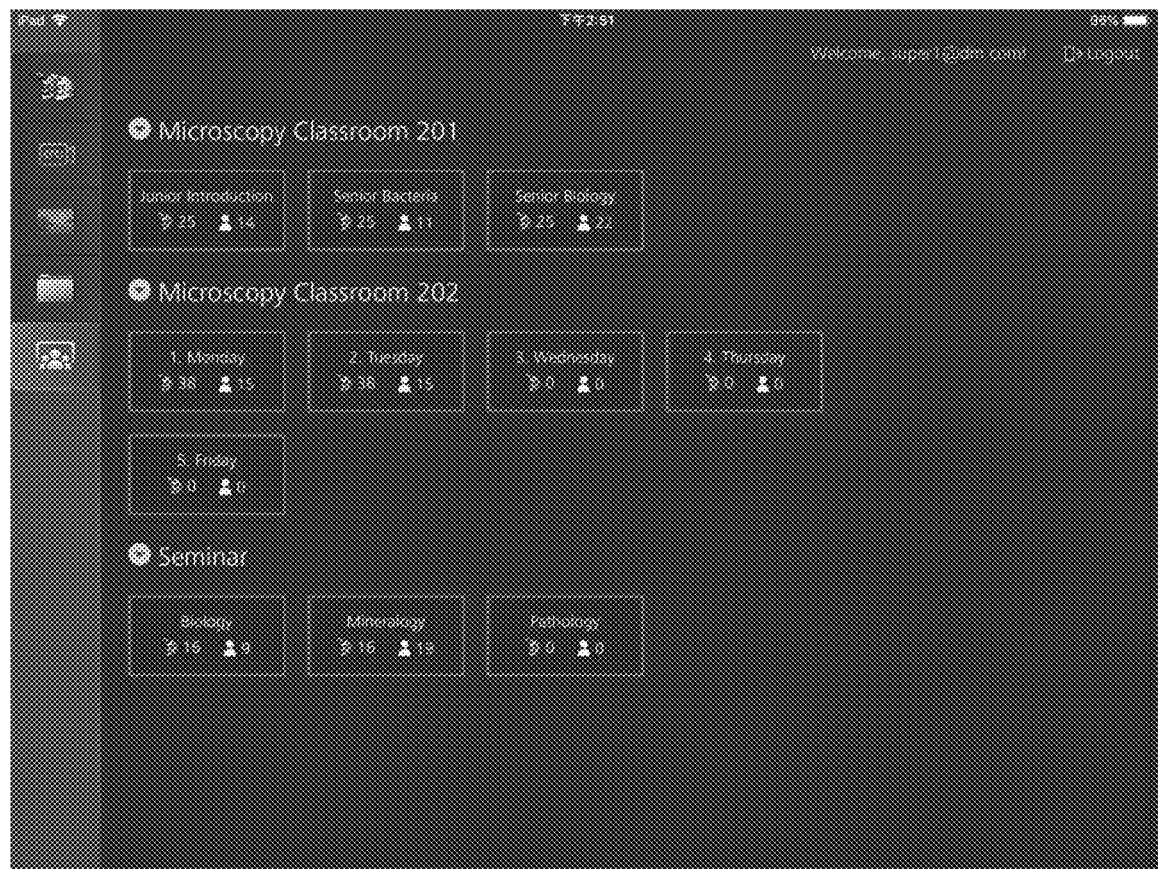
FIG. 18 shows the user interface of the management smart terminal of the visual teaching system when choosing a course according to one embodiment of this disclosure.

After the establishment and setup of the classroom, the teacher can return to the course selection interface for the classroom to select the course to be started, as shown in FIG. 18. This selection interface is visible only to the logged-in teachers.

After entering the classroom sub-interface for the selected course, the teacher can check the information of the course. After the geometrical arrangement and the status of microscopes and students meets the requirements of the course, the teacher can issue the command of starting class to the user smart terminals of the students, and the students start operating microscopes under the guidance of the teacher. For example, the teachers can demonstrate by sending their microscope operation processes, parameters, and images to the user smart terminals of the students, and also request the students to carry out the experiments by accessing the public courseware in the storage space or the content stored in the private storage subspace of the teacher.

Figure 19:
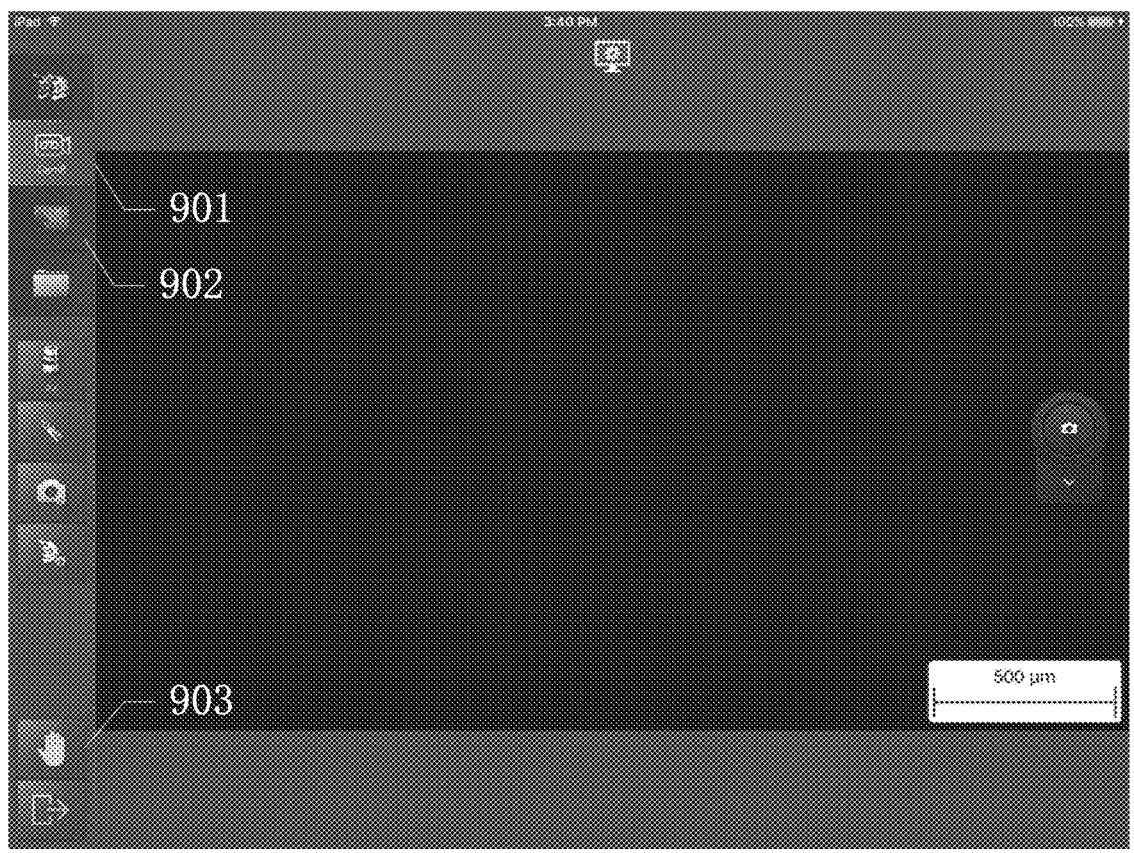
FIG. 19 shows the user interface of the user smart terminal of the visual teaching system when students enter the course according to one embodiment of this disclosure.

The user interface of the user smart terminals of the students is shown in FIG. 19. The students can log in on the user smart terminals to anticipate the course and use at least one microscope corresponding to the user smart terminal. During the course, the students can choose to display the microscopic observations in the form of real time video as shown in Function 901, or in the form of image as shown in Function 902. In addition, the students can also click the hand raising symbol 903 in the user interface to send a request of hand raising to the teacher for asking questions, indicating completion of the experiment or other requesting functions. The user interface of the user smart terminal can also have the functions of accessing the storage space and private storage subspace, selecting microscopes, recording experimental data, and conducting social interaction, etc.

Figure 20:
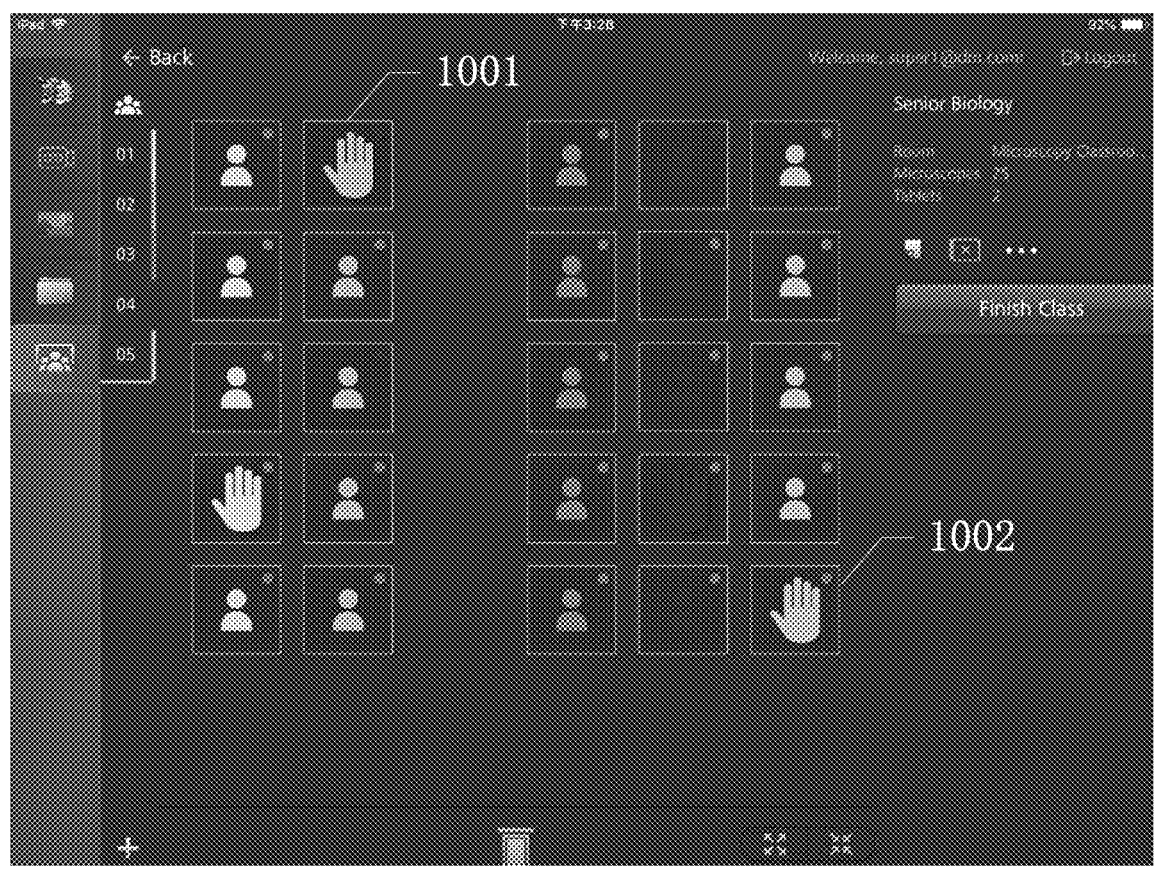
FIG. 20 shows the user interface of the management smart terminal of the visual teaching system when a user smart terminal of a student initiates a request of hand raising during the course according to one embodiment of this disclosure.

During the course, the teachers can monitor the operation to microscopes by the students and the status of students and microscopes, and receive the requests of raising-hand by the students through the management smart terminal in real time. As shown in FIG. 20, the user interface of the management smart terminal of the teacher presents the status of the user smart terminal of each student and the status of the microscope operated by each student. By monitoring the status, the teacher obtains the learning situation of the students in the course in real time, and sends control commands to the students and microscopes actively or in response to the corresponding events.

For example, in the user interface shown in FIG. 20, the symbol of the user smart terminal 1001 of the student becomes a symbol of "hand raising", indicating that the student with the user smart terminal 1001 selects the function of "hand raising" on his own user smart terminal to send a request of hand raising request to the teacher. At the same time, the symbol of the user smart terminal 1002 of the student also becomes the symbol of hand raising, indicating that the student also sends a request of hand raising to the teacher. For these two requests, the teacher can further judge the specific purpose of the request based on the status of the microscope corresponding to the user smart terminal. For example, if the symbol at the upper right corner of the user smart terminal 1001 is in red, which means that the student corresponding to user smart terminal 1001 does not operate the microscope or the microscope is in abnormal conditions (since the student sends a request of hand raising, the case of being offline is excluded), the teacher can preliminarily determine that the student may have the problems in operating the microscope and need the teacher to check or guide. For another example, if the symbol of the user smart terminal 1002 is in green, which indicates that the student corresponding to the user smart terminal is operating the microscope and/or the microscope is in normal conditions, the teacher can preliminarily determine that the student may have finished the experiment or has questions to ask.

Figure 21:
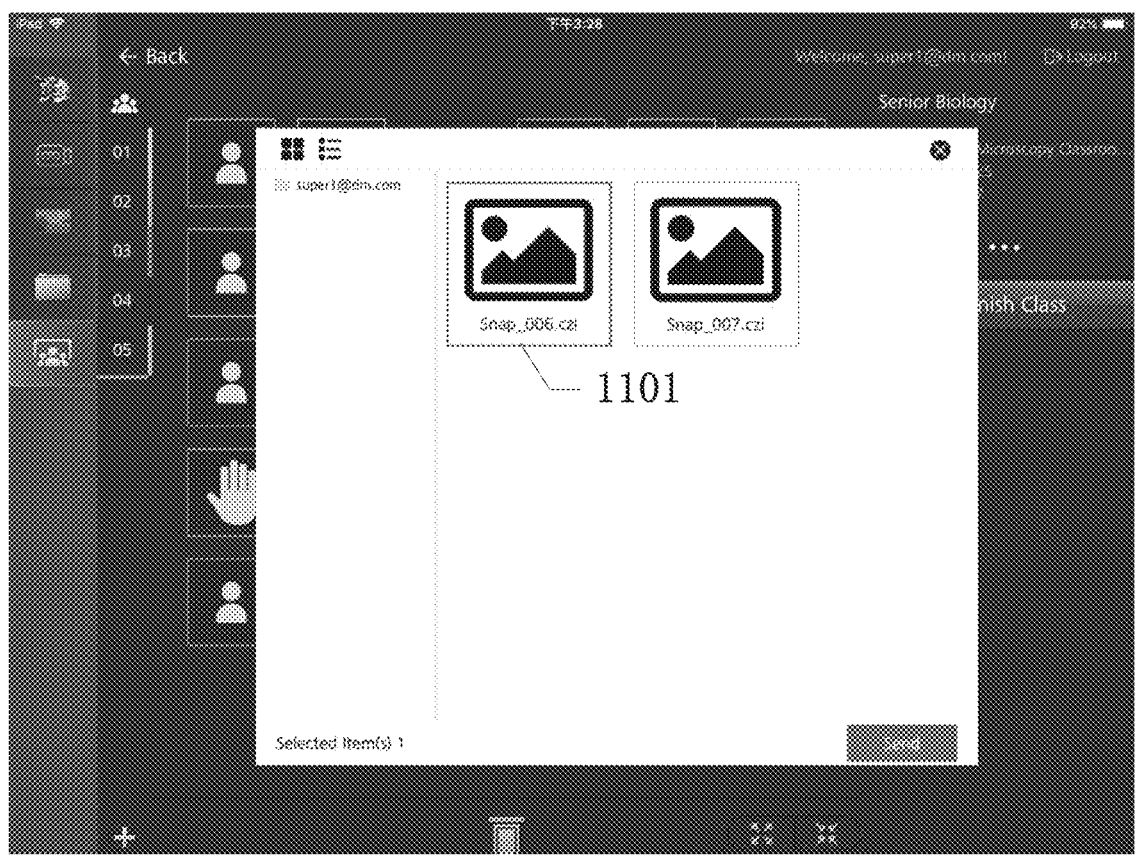
FIG. 21 shows another user interface of the management smart terminal of the visual teaching system during the course according to one embodiment of this disclosure.

According to the embodiment of the disclosure as shown in FIG. 21, if the teacher determines that the student corresponding to user smart terminal 1002 has finished the microscopy operation and obtained the experimental results, he or she can, by command, share or broadcast real-time video and image 1101 of the status and experimental results of microscopy presented on the user smart terminal 1002 of the student to the user smart terminals of other students in the user interface of the management smart terminal, or notify other students to obtain the relevant information by accessing the user smart terminal 1002 of the student who has finished the experiment. The teachers can also switch between different command ranges by simple ways. For example, the teacher can, by command, send the information and data of user smart terminal 1002 of the student who has finished the experiment to a specific student, a specific group of students or all of the students, and can also respond to the request of a student to send the information and data of the user smart terminal 1002 of the student who has finished the experiment to those who send the request.

After the course is conducted, the students leave the classroom and the user smart terminals of the students are disconnected or logged out from the course. The students can also re-use the user smart terminals after course to log in or connect to the history course, access the content in their private storage subspace, and access data such as courseware shared in the storage space of the history course under permission. According to some embodiments, students can also share data stored in their own private storage subspace for after-class communication, such as completing after-class homework, from each other.

For teachers, they have more permissions than students after the course is conducted. For example, a teacher can still access the public data in the storage space of the history course and data in the private storage subspace of the students to carry out a post-course analysis. The teachers can also put post-class homework in the form of new programs or data into the private storage subspace of the students after the course. However, the system setting generally permits the teacher to access the storage space and private storage subspace that correspond to his/her own course only, rather than the storage space and private storage subspace of other courses that are not conducted by him/her. Such permission setting can protect the students' privacy. Similarly, the students have different privacy settings in different courses, and have different private storage subspace for different courses or folders for different courses in their own private storage subspace. The private storage subspaces of different students who anticipating the same course, or the private storage subspaces of the students who anticipate different courses, are generally not shared without specific access permission settings.

According the embodiment of the disclosure, the above functions and settings for visual teaching in the classroom can be an integrated function of microscope imaging software. For convenient operation and clear notification, the user interface of each smart terminal can highlight the symbols of specific functions, for example, by increasing the size or adding dynamic effect, or by providing prompt or warning information, such as in the style of "Attention", to call attention of users. According to some embodiments, the symbols with low frequency of use can also be hidden or placed in the lower-level menu of the user interface. In the user interface, multimedia guide documents or tutorials like "How-to" can also be provided for users to learn.

The visual teaching method and system according to the embodiment of the disclosure provides an explicit course-oriented and student-oriented solution that combines courses, microscopes and students. It solves the problem that teachers cannot obtain the real layout of the classroom and the correspondence relationship between the students and teaching devices by conventional schemes, overcomes the shortcoming that the teachers cannot adjust the layout of the visual classroom and data sharing for a specific course, and the privacy problem of the conventional multimedia teaching schemes, and provides more information to the participants of the course in the classroom.

In the course, users of the software of the smart terminal (teachers and students) interact with each other instead of interacting by using microscopes respectively. File access and sharing in the storage space and commands are transmitted between user devices and management devices rather than via microscopes. The server forwards the data from all units. The teachers can prepare for the courses which is conducted in the real classroom, and establishes specific visual classroom environment according to different courses to map these courses with those in the real classroom. The teachers can monitor the status of the teaching devices and students during the course, share course content and data in the class by group, and ensure the privacy of course participants through access permission management of teaching devices and storage space. The course is simple to operate with greater flexibility.

According to the visual teaching integration solution according to the embodiment of the present disclosure, all functions are implemented in the software and a smooth workflow is realized, to provide the advantages of interconnectivity and cooperation. The concept of classroom can support larger classrooms, visualize the layout in the classroom and make it easier to assign access permissions to teaching devices such as microscopes. By introducing the concept of grouping, sharing and management of grouping-based discussions, grouping-based tasks and grouping-based file sharing become more efficient.

Figure 22:
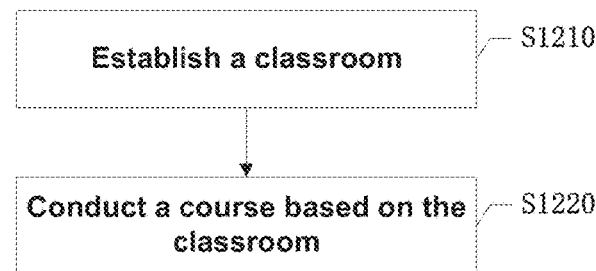
FIG. 22 shows the steps of the visual teaching method according to one embodiment of this disclosure.

According to the embodiment of the disclosure, a method for visual teaching as shown in FIG. 22 is proposed, including the steps of:

S1210: establishing a classroom; and

S1220: conducting the course based on the classroom.

The classroom can comprise at least one user smart terminal and at least one teaching device; each of the user smart terminal operates corresponding teaching device and obtains the status of the corresponding teaching device. The classroom also comprises a management smart terminal that operates the corresponding teaching device and obtains the status of the corresponding teaching device; the management smart terminal, at least one teaching device, and at least one user smart terminal are, respectively, communicatively connected to the server operating the classroom.

According to the embodiment, establishing a classroom can comprise at least one of the following: arranging the geometric layout of at least one teaching device in the classroom based on the real geometric layout of at least one teaching device; creating courses and selecting user smart terminals and teaching devices based on the courses; based on the courses, setting at least one of the following: access permissions of each user smart terminal, access permissions of each teaching device, and the functions of each user smart terminal; grouping the user smart terminals and teaching devices, setting different access permissions to the teaching devices for the user smart terminals in different groups, setting different access permissions to the user smart terminals for teaching devices in different groups; displaying the status of at least one of the user smart terminals and teaching devices; establishing storage space for storing the course content based on the course; and setting private storage subspace in the storage space and the access permissions to the private storage subspace for the management smart terminal and each of the user smart terminals.

According to the embodiment of the disclosure, conducting a course based on the classroom may comprise at least one of the following: sending commands to user smart terminals; sending commands to the user smart terminals in different groups; sending the status of teaching devices operated by the management smart terminal to the user smart terminals; monitoring the status of the teaching devices operated by the user smart terminals; sending the status of the teaching devices operated by the user smart terminals to other user smart terminals; accessing the private storage subspace of the management smart terminal and user smart terminals; accessing the private storage subspace of at least one of the management smart terminal and the user smart terminals after the course is conducted.

Figure 23:
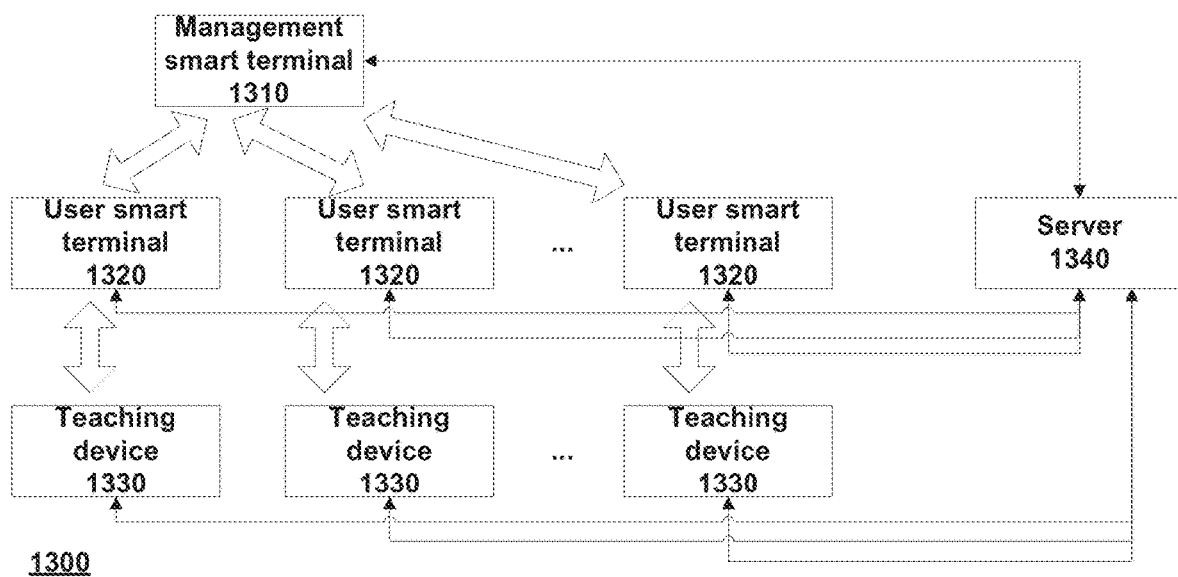
FIG. 23 shows the structure diagram of the visual teaching apparatus according to one embodiment of this disclosure.

According to the embodiment of the disclosure, a visual teaching apparatus is also proposed, as shown in FIG. 23. The visual teaching device 1300 can include at least one teaching device 1330; at least one user smart terminal 1320, each user smart terminal operates the corresponding teaching device 1330 and obtains the status of the corresponding teaching device 1330; a management smart terminal 1310 configured to establish a classroom and conduct a course based on the classroom which includes the user smart terminals 1320 and the teaching devices 1330. The visual teaching device 1300 can also include a server 1340 configured to operate the classroom. The management smart terminal 1320, at least one teaching device 1330 and at least one user smart terminal 1320 are communicatively connected to the server 1340, respectively.

According to an embodiment, the management smart terminal 1310 can also operate the corresponding teaching device 1330 and obtains the status of the corresponding teaching device 1330. The management smart terminal 1310 can also be configured to achieve at least one of the following functions: arranging the geometric layout of at least one the teaching device 1330 in the classroom based on the real geometric layout of the at least one the teaching device 1330; creating courses first and then selecting the user smart terminals 1320 and the teaching devices 1330 based on the courses; setting at least one of the following based on the course: access permissions of each user smart terminal 1320, access permissions of each the teaching device 1330, and the functions of each user smart terminal 1320; grouping the user smart terminals 1320 and the teaching devices 1330; setting different access permissions to the teaching devices 1330 for the user smart terminal 1320 in different groups, setting different access permissions to the user smart terminal 1320 for the teaching device 1330 in different groups; displaying the status of at least one of the user smart terminal 1320 and the teaching device 1330; sending commands to the user smart terminal 1320; sending commands to the user smart terminal 1320 in different groups; sending the status of the teaching device 1330 operated by the management smart terminal 1310 to the user smart terminals 1320; monitoring the status of the teaching devices 1330 operated by the user smart terminals 1320; sending the status of the teaching devices 1330 operated by the user smart terminals 1320 to other the user smart terminals 1320; establishing a storage space for storing the course content based on the course; setting private storage subspace in the storage space and access permissions to the private storage subspace for the management smart terminal 1320 and each of the user smart terminals 1330; accessing the private storage subspaces of the user smart terminals 1320; sharing the private storage subspace of the user smart terminals 1320 to other the user smart terminals 1320; accessing the private storage subspace of at least one of the management smart terminal 1310 and the user smart terminals 1320 after the course is conducted.

According to the embodiment of the disclosure, the user smart terminal 1320 can also be configured to achieve at least one of the following functions: accessing the private storage subspace of the management smart terminal 1310; accessing the private storage subspace of other the user smart terminals 1320; accessing the private storage subspace of at least one of the management smart terminal 1310 and the user smart terminals 1320 after the course is conducted.

In the embodiment of the disclosure, a computer-readable storage medium is also provided on which a computer program is stored, wherein the computer program includes executable instructions when, for example, are executed by a processor implement the steps of the method for visual teaching described in any of the above embodiments. In some possible embodiments, any of the aspects of this disclosure can be implemented in the form of a program product including program code. When the program product is operated on a smart terminal device, the program code is used to enable the smart terminal device to perform the steps described in the method for visual teaching according to various exemplary embodiments of this disclosure.

It will be easy for persons skilled in the art to conceive other embodiments of this disclosure after considering the description and practicing what disclosed here. This application is intended to cover any variation, use or adaptation to this disclosure. The description and the embodiments are regarded only as exemplary and the true scope and spirit of this disclosure is indicated by the attached claims.

What is claimed is:

1. A method for visual teaching, comprising:
   establishing a classroom, the classroom comprising at least one user smart terminal, at least one teaching device, and at least one of a management smart terminal and a server, at least one of the at least one teaching device and at least one user smart terminal is communicatively connected to at least one of the management smart terminal and the server operating the classroom respectively, each of the user smart terminals operating at least one corresponding teaching device and obtaining the status of the corresponding teaching device;
   arranging the classroom based on the real geometric layout of the at least one teaching device in the classroom, and conducting a course in the classroom based on the arranged classroom.

2. The method according to claim 1, wherein establishing a classroom comprising:
   setting the geometric layout of at least one teaching device in the classroom by at least one of the management smart terminal and the server, based on the real geometric layout of at least one teaching device in the classroom.

3. The method according to claim 1, wherein the classroom is displayed as a space in form of grid group composed of grids on at least one of the user smart terminals and the management smart terminal, and at least one of the teaching devices and the user smart terminals is placed in the grids.

4. The method according to claim 3, comprising setting the number of the grids and the size and shape of the grid group, wherein the number of the grids and the size of the grid group are set by defining the size of a matrix or by dragging the objects displayed in the graphic user interface of at least one of the management smart terminal and the server, and the object corresponds to at least one of the teaching devices, the user smart terminals, and the boundary of the grid group.

5. The method according to claim 1, wherein the teaching devices are microscopes.

6. The method according to claim 1, wherein the students log in on the user smart terminals and use the user smart terminals to operate at least one teaching device corresponding to the user smart terminals in the course.

7. The method according to claim 6, wherein the teaching devices which are not used in the course and the user smart terminals which are not involved in the course are not displayed, or are displayed in a way different from the way that the teaching devices which are used in the course and the user smart terminals which are involved in the course are displayed.

8. The method according to claim 2, wherein arranging the geometric layout of at least one teaching device in the classroom further comprising:
   adjusting a layout of the classroom to include the teaching devices outside the layout of the classroom, when the teaching devices are placing outside the layout of the classroom; and
   indicating that the at least one teaching device is placed at a wrong position, when the teaching devices are placed outside the layout of the classroom or the teaching devices are placed at the positions where other teaching devices have been placed.

9. The method according to claim 1, wherein:
   the user smart terminals and the teaching devices are set by templates, wherein the templates comprise the setting parameters corresponding to at least one of the access permissions and the functions of the user smart terminals and the teaching devices.

10. The method according to claim 1, wherein establishing a classroom further comprising:
    grouping of the user smart terminals and the teaching devices, and
    setting different access permissions to the teaching devices for the user smart terminals in different groups, and setting different access permissions to the user smart terminals for the teaching devices in different groups.

11. The method according to claim 1, wherein:
    displaying the status of at least one of the user smart terminals and the teaching devices, the status comprising at least one of the following: the positions of the user smart terminals, the online status of the user smart terminals, failure status of the user smart terminals, interconnection status of the user smart terminals, use of the user smart terminals, positions of the teaching devices, online status of the teaching devices, fault status of the teaching devices, interconnection status of the teaching devices, and operation status of the teaching devices.

12. The method according to claim 1, wherein establishing a classroom further comprising:
    establishing storage space for storing the course content based on the course.

13. An apparatus for visual teaching, comprising:
    at least one teaching device;
    at least one user smart terminal, each of the user smart terminals operating at least one corresponding teaching device and obtaining the status of the corresponding teaching device;
    at least one of a management smart terminal and a server configured to establish a classroom and conduct a course based on the classroom, the classroom comprising the user smart terminals and the teaching devices, and configured to operate the classroom, at least one of the at least one teaching device and the at least one user smart terminal is communicatively connected to the management smart terminal and/or the server respectively;
    wherein the classroom is arranged based on the real geometric layout of the at least one teaching device in the classroom, and the course is conducted in the classroom based on the arranged classroom by at least one of the management smart terminal and the server.

14. The apparatus according to claim 13, wherein the classroom is displayed as a space in form of grid group composed of grids on at least one of the user smart terminals and the management smart terminal, and at least one of the teaching devices and the user smart terminals is placed in the grid.

15. The apparatus according to claim 14, wherein at least one of the management smart terminal and the server is further configured to set the number of the grids and the size and shape of the grid group, wherein the number of the grids and the size of the grid group are set by defining the size of a matrix or by dragging the objects displayed in the graphic user interface of at least one of the management smart terminal and the server, and the object corresponds to at least one of the teaching devices, the user smart terminals, and the boundary of the grid group.

16. The apparatus according to claim 13, wherein the teaching devices are microscopes.

17. The apparatus according to claim 13, wherein the students log in on the user smart terminals and use the user smart terminals to operate at least one teaching device corresponding to the user smart terminals in the course.

18. The apparatus according to claim 17, wherein the teaching devices which are not used in the course and the user smart terminals which are not involved in the course are not displayed, or are displayed in a way different from the way that the teaching devices which are used in the course and the user smart terminals which are involved in the course are displayed.

19. The apparatus according to claim 13, wherein the management smart terminal is further configured to:

adjust a layout of the classroom to include the teaching devices outside the layout of the classroom, when the teaching devices are placing outside the layout of the classroom; and indicate that the at least one teaching device is placed at a wrong position, when the teaching devices are placed outside the layout of the classroom or the teaching devices are placed at the positions where other teaching devices have been placed.

20. The apparatus according to claim 13, wherein the management smart terminal is further configured to:

not display the teaching devices which are not used in the course and the user smart terminals which are not involved in the course, or display the teaching devices which are not used in the course and the user smart terminals which are not involved in the course in a way different from the way that the teaching devices which are used in the course and the user smart terminals which are involved in the course are displayed.

21. The apparatus according to claim 13, wherein the management smart terminal is further configured to:

set the user smart terminals and the teaching devices by templates, wherein the templates comprise the setting parameters corresponding to at least one of the access permissions and the functions of the user smart terminals and the teaching devices.

22. The apparatus according to claim 13, wherein the management smart terminal is further configured to:

group the user smart terminals and the teaching devices, and set different access permissions to the teaching devices for the user smart terminals in different groups, and set different access permissions to the user smart terminals for the teaching devices in different groups.

* * * * *